US011498087B2

(12) United States Patent
Turner et al.

(10) Patent No.: US 11,498,087 B2
(45) Date of Patent: Nov. 15, 2022

(54) CONNECTING DEVICE

(71) Applicant: Sulzer Mixpac AG, Haag (CH)

(72) Inventors: Hayden Turner, Ayer, MA (US); Evan Travers, Groveland, MA (US); Ryan Pelletier, Litchfield, NH (US)

(73) Assignee: MEDMIX SWITZERLAND AG, Haag (CH)

( * ) Notice: Subject to any disclaimer, the term of this patent is extended or adjusted under 35 U.S.C. 154(b) by 275 days.

(21) Appl. No.: 16/456,162

(22) Filed: Jun. 28, 2019

(65) Prior Publication Data

US 2020/0408342 A1 Dec. 31, 2020

(51) Int. Cl.
| | | |
|---|---|---|
| *B05B 7/26* | (2006.01) | |
| *F16L 33/22* | (2006.01) | |
| *F16L 37/086* | (2006.01) | |
| *F16L 37/098* | (2006.01) | |
| *F16L 43/00* | (2006.01) | |

(52) U.S. Cl.
CPC ............ *B05B 7/262* (2013.01); *F16L 33/222* (2013.01); *F16L 37/086* (2013.01); *F16L 37/0985* (2013.01); *F16L 43/008* (2013.01)

(58) Field of Classification Search
CPC .......... B05B 7/04; B05B 7/0408; F16L 33/22; F16L 33/30; F16L 33/225; F16L 37/086; F16L 37/0985; F16L 43/008; F16L 47/12
USPC ........................................................ 285/239
See application file for complete search history.

(56) References Cited

U.S. PATENT DOCUMENTS

| | | | |
|---|---|---|---|
| 2,528,927 A | 11/1950 | Vose | |
| 5,799,986 A * | 9/1998 | Corbett | ............... F16L 37/0985 |
| 5,813,703 A | 9/1998 | Reinholz | |
| 6,375,096 B1 | 4/2002 | Rashidi | |
| 6,550,750 B1 | 4/2003 | Kalkstein et al. | |
| 6,572,031 B2 | 6/2003 | Hunter et al. | |
| 6,601,782 B1 | 8/2003 | Sandholm | |
| 8,591,099 B2 | 11/2013 | Reddy | |
| 8,662,543 B2 * | 3/2014 | Lechner | .............. F16L 37/0982 |
| 9,517,488 B2 | 12/2016 | Frey | |
| 10,639,656 B1 * | 5/2020 | Hammerlund | ........ B05B 7/0408 |
| 2008/0001007 A1 * | 1/2008 | Gilpatrick | ............. B05B 7/0408 |
| 2013/0119158 A1 * | 5/2013 | Hiemer | ..................... B05B 7/04 |
| 2014/0117044 A1 * | 5/2014 | Pappalardo | ....... B05C 17/00553 |
| 2016/0146387 A1 * | 5/2016 | Hunt | ....................... F16L 33/22 |
| 2016/0178101 A1 * | 6/2016 | Blake | .................... F16L 33/225 |
| 2017/0009920 A1 * | 1/2017 | Canatella | ............ F16L 37/0985 |
| 2018/0216769 A1 * | 8/2018 | Rodriguez | .......... F16L 37/0985 |
| 2019/0285215 A1 * | 9/2019 | Hamadene | .......... F16L 37/0982 |

FOREIGN PATENT DOCUMENTS

| | | |
|---|---|---|
| CN | 107470096 A | 12/2017 |
| GB | 622818 A | 5/1949 |

* cited by examiner

*Primary Examiner* — Zachary T Dragicevich
(74) *Attorney, Agent, or Firm* — Global IP Counselors, LLP

(57) ABSTRACT

A connecting device for connecting two or more components to one another, includes an inlet section and an outlet section. The inlet section and the outlet section respectively include one or more connectors for each of the two or more components, with one or more passages extending between the inlet section and the outlet section, with the connecting device being of single piece design and being plastic.

16 Claims, 35 Drawing Sheets

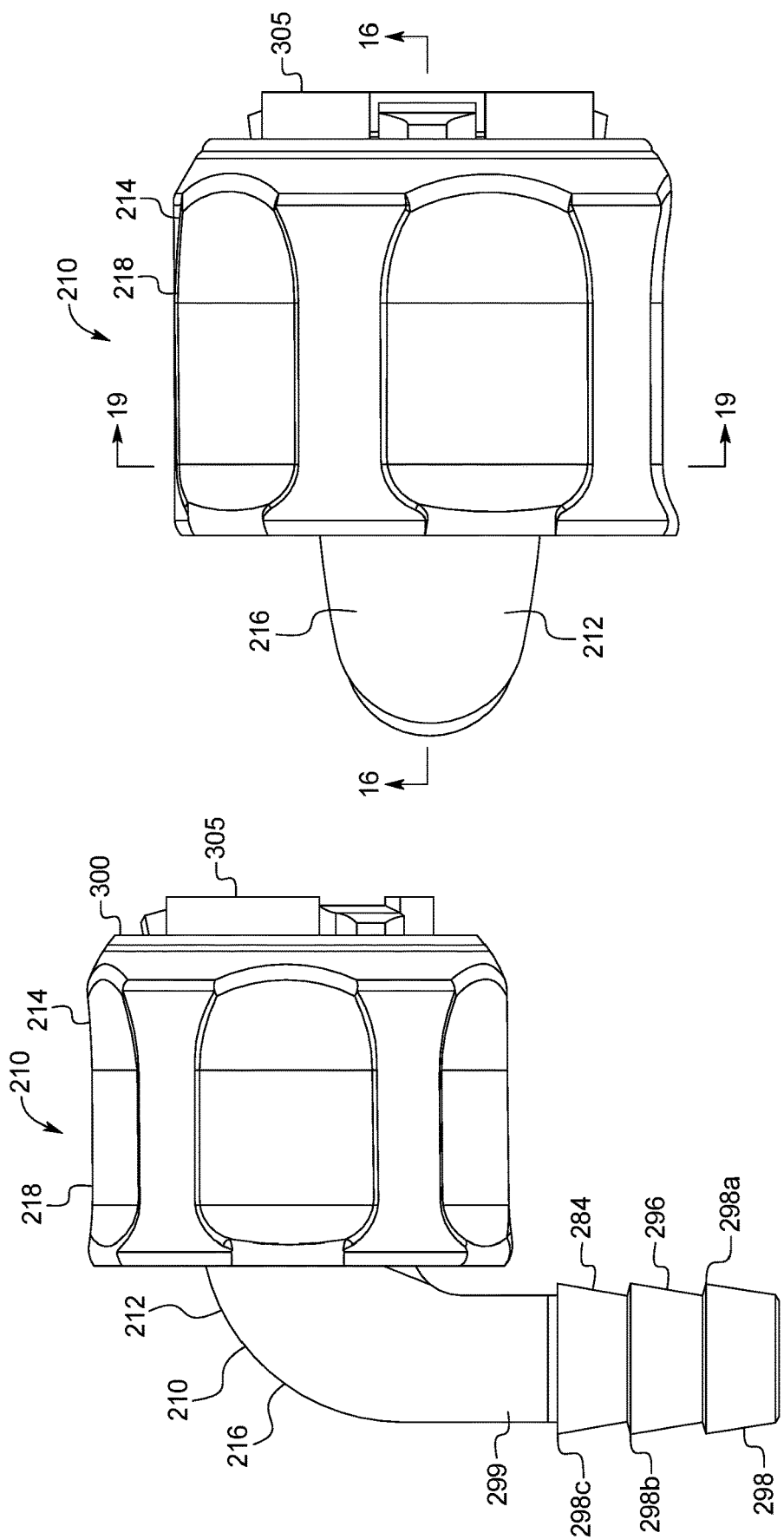

CONNECTING DEVICE

BACKGROUND

Field of the Invention

The present invention generally relates to a connecting device. In particular, the present invention generally relates to a connecting device for connecting two or more components to one another.

Background Information

Conventional spray mixers include a mixing device with a spray nozzle attached to an end thereof, a hose for pressurized gas and an elbow between the hose and the spray nozzle. As a compound exits the mixer device it enters the spray nozzle and combines with the pressurized gas that passes from the hose through the elbow and into the spray nozzle. The spray nozzle, along with the pressurized gas, then sprays the compound on a surface or other structure.

SUMMARY

It has been discovered that an improved device to connect a hose and a spray nozzle (or any suitable components) for a spray device is desired. In view of the state of the known technology, one aspect of the present disclosure is to provide a connecting device for connecting two or more components to one another. The connecting device comprises an inlet section and an outlet section. The inlet section and the outlet section respectively comprise one or more connectors for each of the two or more components, with one or more passages extending between the inlet section and the outlet section, with the connecting device being of single piece design and being plastic.

Another aspect of the present disclosure is to provide a connecting device for connecting two or more components to one another. The connecting device comprises an inlet section and an outlet section. The inlet section and the outlet section respectively comprise one or more connectors for each of the two or more components, with one or more passages extending between the inlet section and outlet section, with the connecting device being of two-piece design and being plastic.

Another aspect of the present disclosure is to provide a spray mixer. The spray mixer comprises a cartridge, a mixer, a spray nozzle and a connecting device. The cartridge is filled with a one-component or multi-component material having one or more outlets. The mixer is attached to the outlets of the cartridge. The spray nozzle is connected either directly to the outlet of the cartridge or to the outlet of the mixer. The connecting device is connected to the spray nozzle for the supply of a gas, and includes an inlet section and an outlet section. The inlet section and the outlet section respectively comprise one or more connectors for each of the two or more components, with one or more passages extending between the inlet section and the outlet section, with the connecting device being of single piece design and being plastic.

BRIEF DESCRIPTION OF THE DRAWINGS

Referring now to the attached drawings which form a part of this original disclosure:

FIG. 14 is a side elevational view of the connecting device of FIG. 12;

FIG. 15 is a top view of the connecting device of FIG. 12;

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
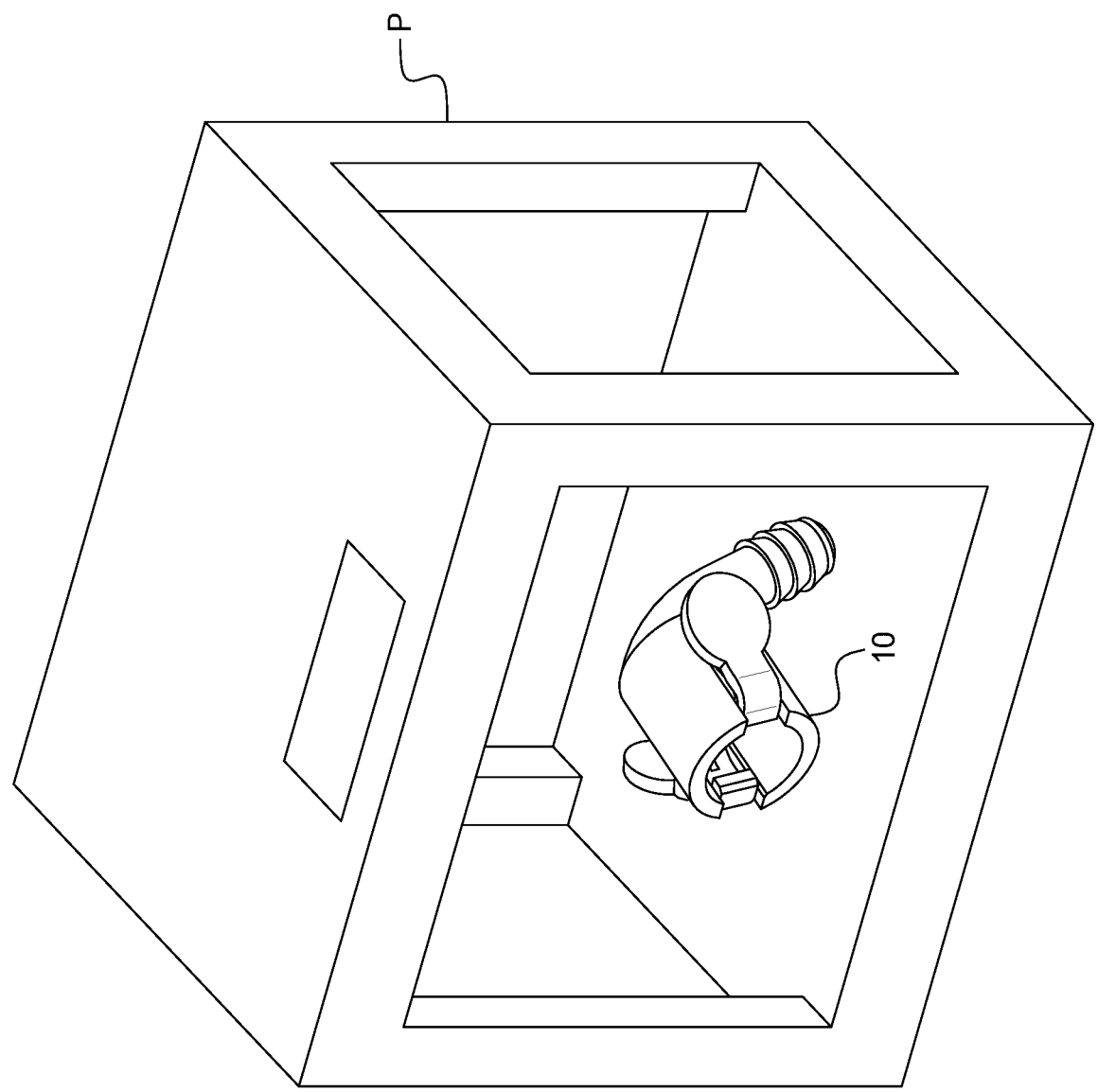
FIG. 1 is a top perspective view of a connecting device according to one embodiment of the present invention being 3d printed by a 3D printer.
Figure 2:
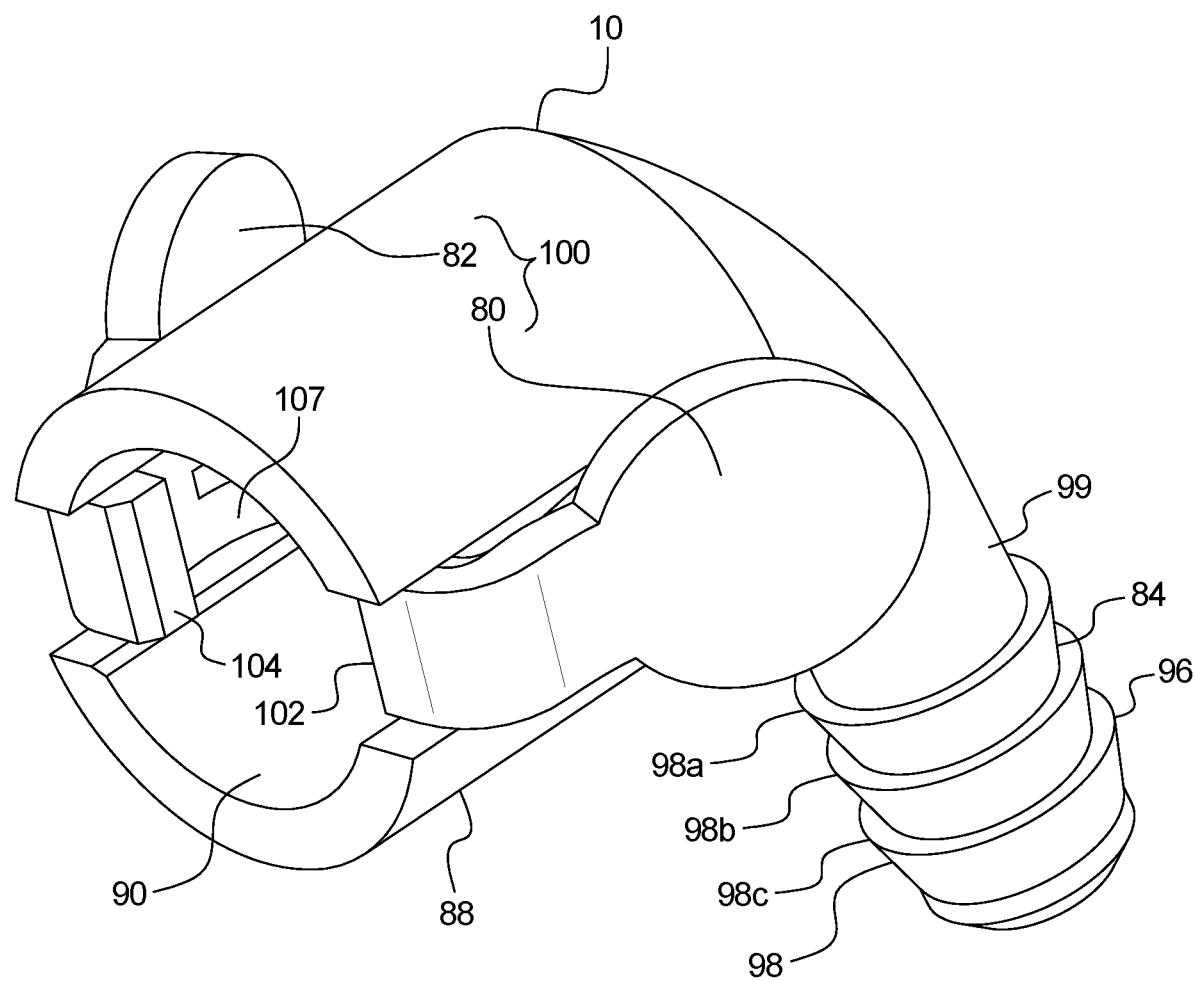
FIG. 2 is a top perspective view of the connecting device of FIG. 2.

Referring initially to FIGS. 1 and 2, a connector or connecting device 10 according to an embodiment of the present invention is shown. FIG. 1 illustrates the connecting device 10 being printed by a 3D printer P. Although the connecting device 10 is shown being printed by a 3D printer, it is noted that the connecting device 10 can be formed in any suitable manner. FIG. 2 illustrates the connecting device 10 after completion of 3D printing or other suitable manner.

Figure 3:
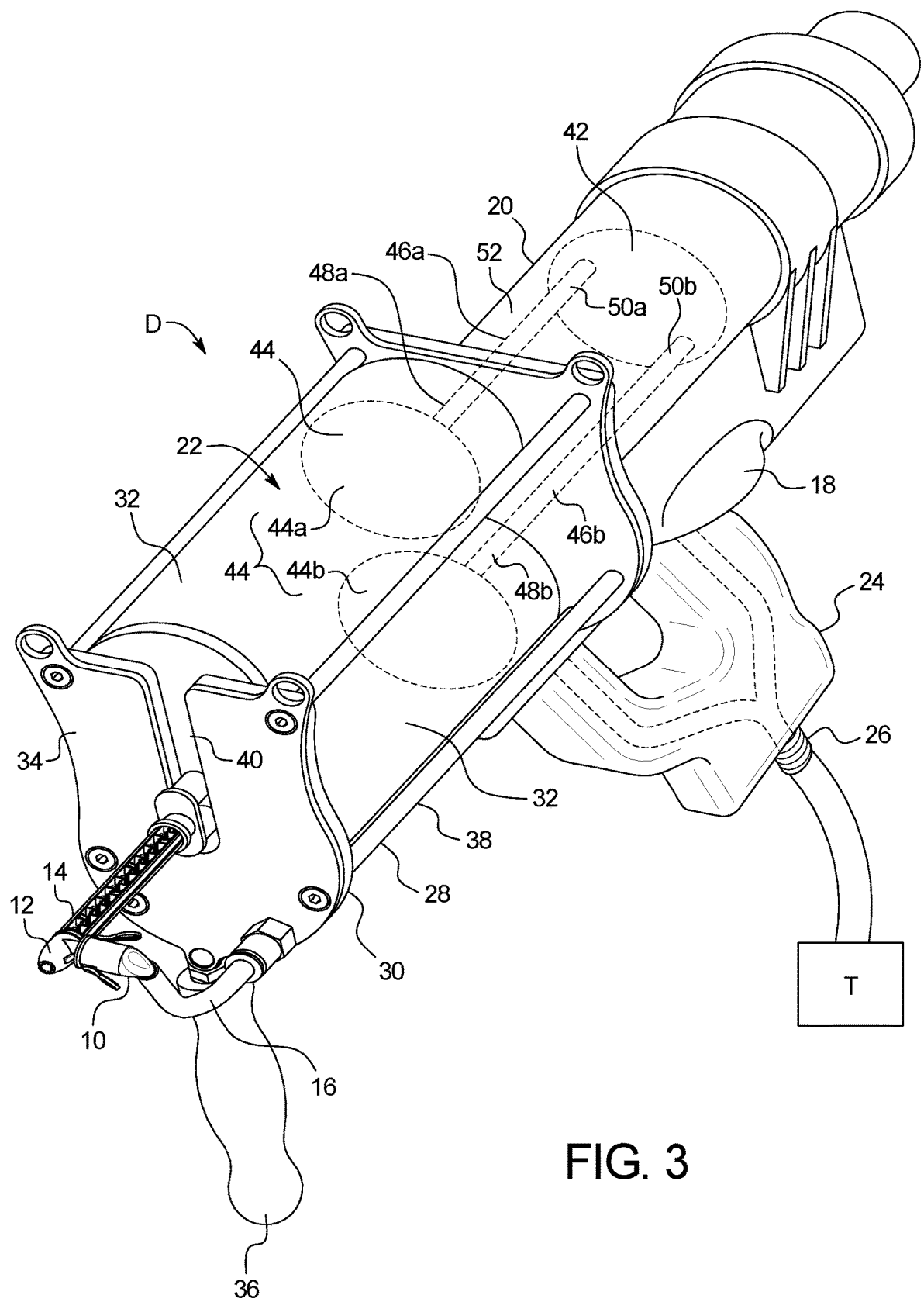
FIG. 3 is a top perspective view of a dispenser that includes the connecting device of FIG. 1.
Figure 5:
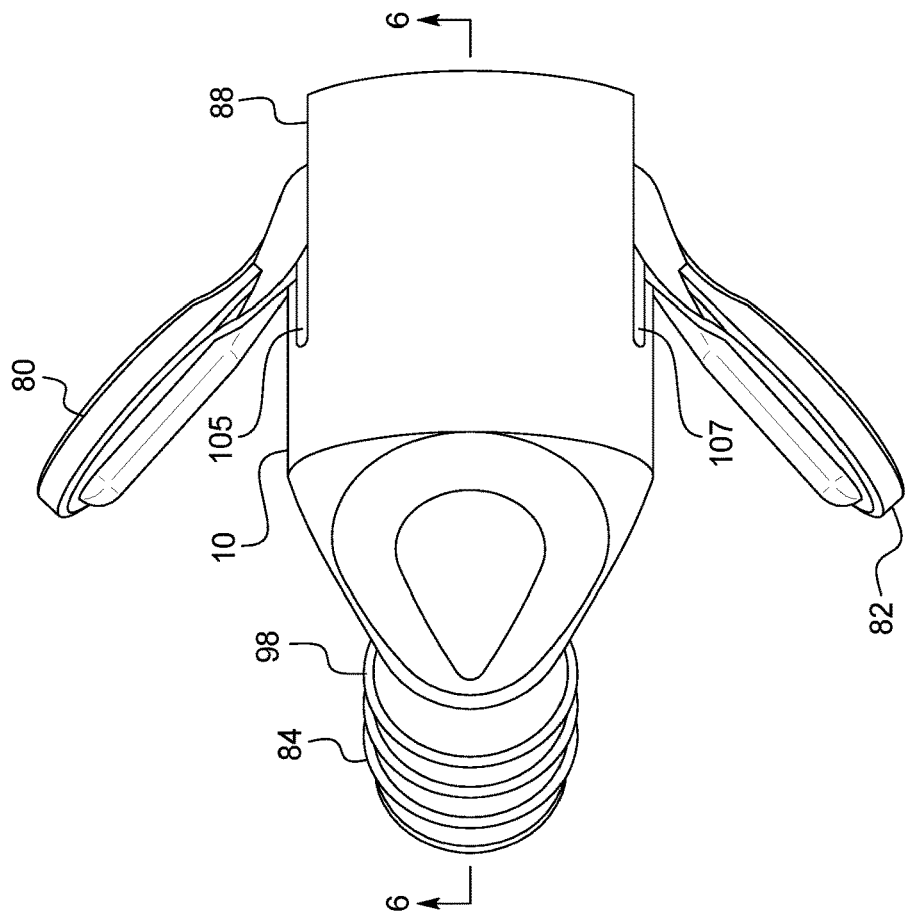
FIG. 5 is a top view of the connecting device of FIG. 4.
Figure 4:
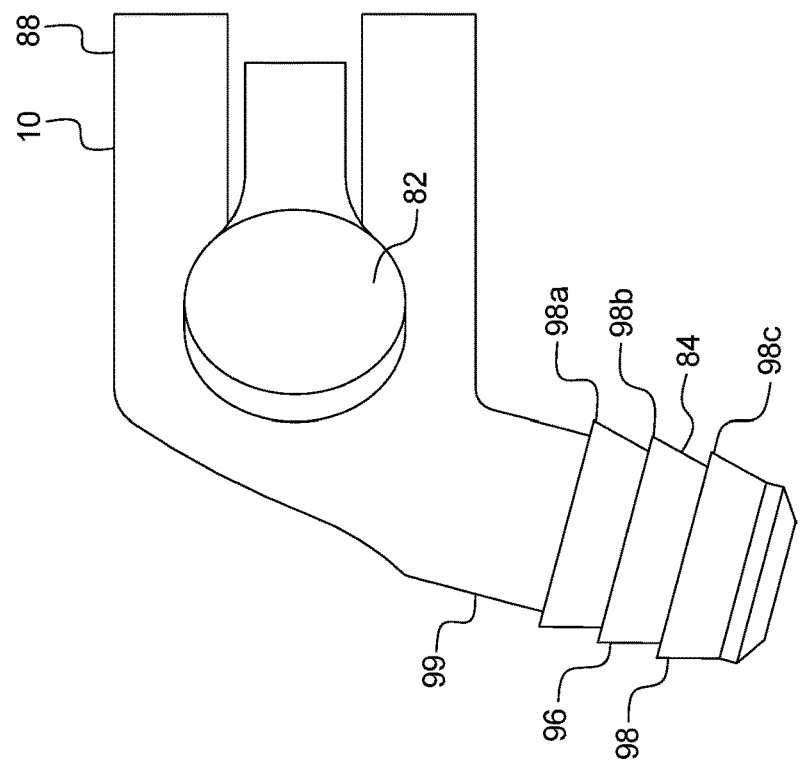
FIG. 4 is a side elevational view of the connecting device of FIG. 2.

As shown in FIG. 3, the connecting device 10 is configured to operate or be operable in a dispensing device or dispenser D. The connecting device 10 is configured to couple a spray nozzle 12, which is connected to an end of a mixer or mixing device 14, and to a pressurized gas hose 16. Thus, as can be understood, the connecting device 10 is disposed between the hose 16 and the spray nozzle 12 of the dispenser D.

The dispenser D can be a spray mixer for the mixing and dispensing of at least two components. That is, the dispenser D can be for a multi-component industrial coating packaging system for use in simultaneously dispensing coatings in one easy step. In this connection it should be noted that also single component coatings could be dispensed using the dispenser D if the dispenser D is configured for dispensing single component materials.

Preferably, the coatings are multi-component, reactive, high-solids low-VOC paints. More preferably, the coatings are multi-component, reactive, high-solids low-VOC marine, military, and industrial paints. The connecting device 10 in use with the dispenser D desirably allows one to dispense or spray two component marine and industrial paints in one continuous step without having to pre-mix either component. As can be understood, the dispenser D allows dispensing of the exact amount of marine, military, and industrial paints while reducing or eliminating the mixer's or painter's exposure to unnecessary hazardous materials, reduces the amount of hazardous waste in application, disposal and clean up, and reduces the amount of VOC's released into the environment. The dispenser D eliminates the need to open and premix coatings, eliminates the need to manually pre-measure coatings into exact ratios for use, significantly reduces waste and generation of excess coating, and provides a direct delivery method for marine and industrial coating by spraying the coating onto the surface to be coated.

As shown in FIG. 3, the dispenser includes a housing 18, a drive unit 20, and a material dispenser 22. The housing 18 includes a handle 24 for gripping by an operator for operating the dispensing device to dispense material. The handle can include a trigger switch or trigger (not shown) and a pressurized fluid control dial (not shown). The housing 18 accommodates the drive unit 20. At the bottom of the housing 18, a pressurized gas inlet 26 is disposed. The pressurized gas inlet 26 connects to a tank T of pressurized gas, for example pressurized air.

A holder 28 is disposed at a front end 30 of the housing 18 to receive a receptacle 32 (or a plurality of receptacles) for material to be dispensed. Thus, the holder 28 defines the front end of the dispenser D. The holder 28 includes a front plate 34, a handle 36 and a pressurized gas line 38. The front plate 34 includes an opening 40 to enable the nozzle of the cartridges 32 to extend therethrough. The opening 40 can be generally U-shaped to enable ease of insertion of the cartridges 32; however, the opening 40 can be any suitable shape. The handle 36 enables a user to grip and control the front end of the dispenser D. This two-hand operation enables better stability and control for the user. The fluid line connects 38 to the pressurized gas inlet 26 through the housing 18 and the hose 16.

The cartridges 32 can be any type of receptacle for material, e.g. cartridge type or sausage type, which are types well known in the art, or any other suitable type of receptacle. The material can be any type of coating or paint. For example, the coating can be any ordinary solvent-based coating or high solid, edge retentive coating for construction and repair. Additionally, the material can be a multi-component, high solid paint that cures a chemical reaction that creates heat after mixing.

The drive unit 20 can include at least one plunger 42 and the material dispenser 22 can include at least one material dispenser (shuttle) 44. In one embodiment, the material dispenser 44 includes a first shuttle 44a and a second shuttle 44b, with each of the shuttles being a plunger configured to be inserted into a respective cartridge 32 or receptacle. Each shuttle 44a and 44b is connected to a respective rod 46a and 46b at a first end 48a and 48b of the rods 46a and 46b so to be capable of driving the material dispenser 44 along the holder 28. The second end 50a and 50b of each rod 46a and 46b is connected to the piston 42 in the drive unit 20. As can be understood, the shuttles 44a and 44b are configured to drive and dispense the materials in a respective cartridge 32. Although the shuttles 44a and 44b are illustrated as plungers, the shuttles 44a and 44b can be any suitable devices.

Since the first and second shuttles 44a and 44b are connected to the piston 42, the first and second shuttles 44a and 44b move in unison. The dispenser D shown is generally used with a side-by-side cartridge 32. That is, the cartridge contains two cartridges 32 adjacent each other such that the first and second shuttles 44a and 44b can be disposed within adjacent cartridges 32 and dispense separate materials simultaneously. Such a system enables materials to thoroughly mix and form an adhesive or mixed material right before or as they are being applied to a surface or area. However, it is noted that the dispenser D can be used with a cartridge or container containing a co-axial container of viscous materials. That is, a cartridge 32 containing two components of viscous material arranged coaxially in the container and separated by an annular partition inside the container. In the coaxial container, the two separate materials are dispensed from their respective containers into a mixer prior to being applied to the specific surface or area. Moreover, as desired, the dispenser D can be used with a single cartridge having only one component (of viscous material or any other suitable container).

The drive unit 20 includes a compartment 52 that is configured to be pressurized by the pressurized gas from the tank T of pressurized gas. The plunger 42 is sealingly disposed inside the compartment and upon the operation of the trigger, the pressurized gas is communicated into the compartment 52 to drive the plunger 42. The plunger 42 moves along the compartment 52, which in turn moves the first and second shuttles 44a and 44b via the rods 46a and 46b.

Figure 9:
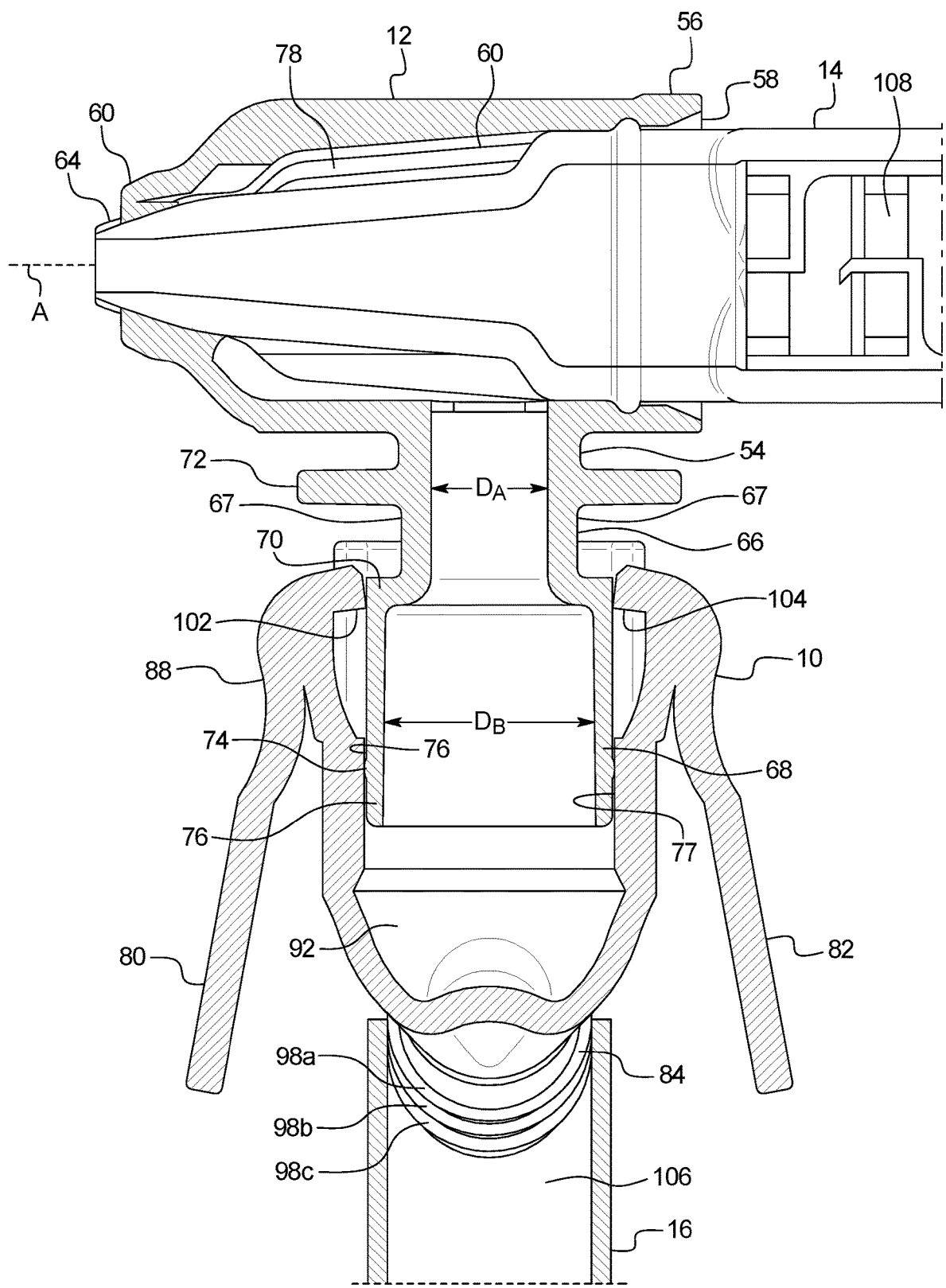
FIG. 9 is a partial top view in section of the connecting device of FIG. 8 being coupled to a spray nozzle.
Figure 10:
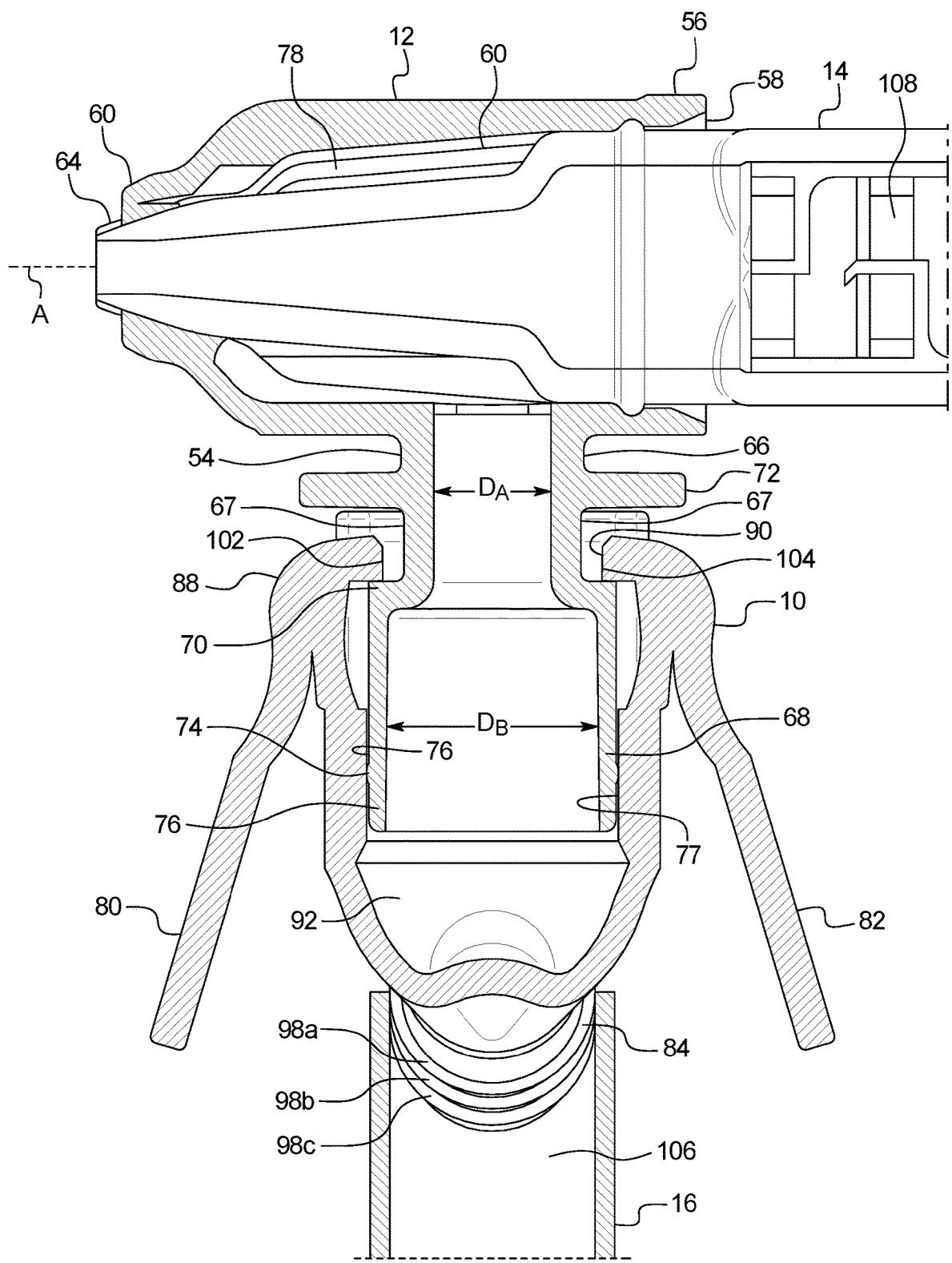
FIG. 10 is a partial top view in section of the connecting device of FIG. 9 coupled to the spray nozzle.

As shown in FIGS. 3, 9 and 10, the spray nozzle 12 is preferably a structure that attaches to the end of the mixing device 14 and has a connecting element 54 (see FIGS. 9 and 10) for the connecting device 10. In one embodiment, the spray nozzle 12 has a first end 56 with a first opening 58 that attaches to the end of the mixer 14 with a passage 60 that extends through the spray nozzle 12 to the second end 62 of the spray nozzle 14. The second end 62 of the spray nozzle has a second opening 64. The connecting element 54 for the connecting device 10 is disposed generally at a right angle to the longitudinal axis A of the passage 60 through the spray nozzle 12 and enables pressurized gas from the hose 16 to pass through the connecting device 10 and into the spray nozzle 12.

As shown in FIGS. 9 and 10, the connecting element 54 has a first portion 66 with a first diameter $D_A$ and a second portion 68 with a second diameter $D_B$, the second diameter $D_B$ being greater than the first diameter $D_A$. Thus, the step up in diameter from the first portion 66 to the second portion 68 forms a shoulder 70.

The first portion 66 also includes a stop member 72 to prevent the connecting device 10 from being inserted beyond a predetermined distance. A recess 67 may be formed between the stop member 72 and the shoulder 72.

The second portion 68 can include a seal member 74 around the exterior surface 76 thereof, if desired. The seal member 74 can be formed from the same material and at the same time as the spray nozzle 12, or the seal member 74 can be formed from rubber or another material and be added to any portion of the spray nozzle 12 or in between any portion of the spray nozzle 12 and the connecting device 10 to prevent pressurized gas from escaping. Alternatively a seal may be formed on an inner surface 77 of the connecting device 10 that interacts with the exterior surface 76.

The introduction of the pressurized gas in this manner (i.e., at a right angle to the longitudinal axis of the passage 60 through the spray nozzle 12), along with the internal structure of the spray nozzle (e.g., swirling grooves 78) enables the pressurized gas and mixed component to be swirled and atomized as it exits the spray nozzle 12. Thus, the mixed component can be sprayed onto a surface or other structure in an atomized mixed manner. It is noted that the spray nozzle 12 can be any suitable spray nozzle that enables a coating or other material to be applied in a suitable manner.

The hose 16 can be any rubber hose that can connect the connecting device 10 to the fluid line. Preferably, the hose 16 is flexible to enable easy adjustment between the dispenser D and the connecting device 10.

As described herein, the connecting device 10 is configured to connect a first component (e.g., the spray nozzle) with a second component (e.g., the hose). The connecting device 10 can be of single piece design and plastic. However, it is noted that the connecting device 10 can be formed in as many pieces as desired and be formed from any suitable material.

As shown in FIGS. 2 and 4-8, the connecting device 10 can be an elbow shaped quick connect type connecting device 10 with wings 80 and 82 that enable a secure connection to the spray nozzle 12. The connecting device 10 has an inlet section 84 with an inlet opening 86 (see FIG. 6) and an outlet section 88 with an outlet opening 90 and a passage 92 extends through the inlet section 84 and outlet section 88 from the inlet opening 86 to the outlet opening 90. It is noted that that the connecting device 10 can include a plurality of inlet openings and outlet openings and a plurality of passages connecting at least some of the inlet openings to some of the outlet openings, if desired.

Figure 6:
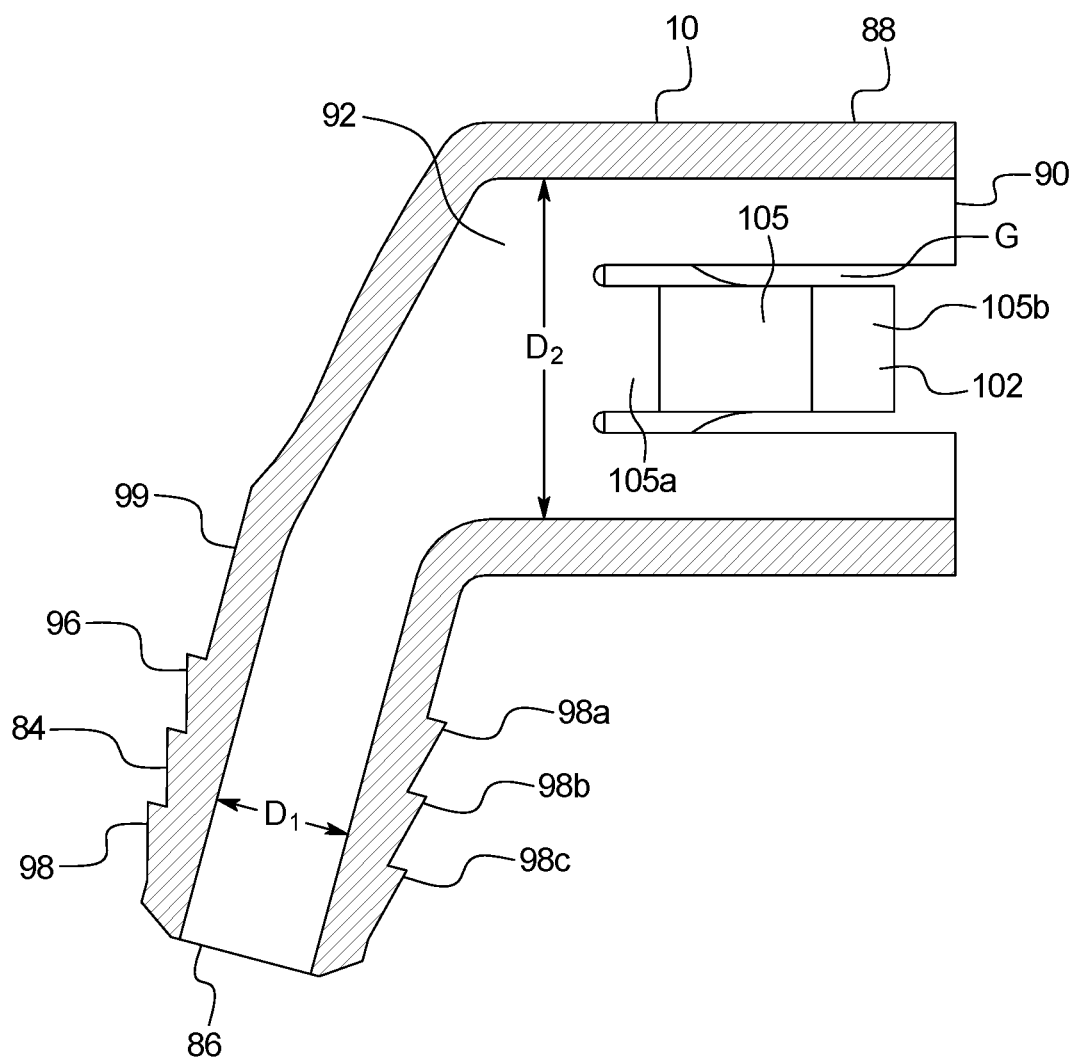
FIG. 6 is a side view in section of the connecting device of FIG. 5 taken along lines 6-6.

As shown in FIG. 6, the passage 82 has a first diameter $D_1$ at the inlet section 84 and a second diameter $D_2$ at the outlet section 88. The diameter $D_2$ can be larger than the diameter $D_1$.

The inlet section 84 preferably is sized and configured to fit within the hose 16 with an interference fit. Thus, the inlet section 84 can have an external diameter that is the same as or substantially similar to the internal diameter of the hose 16.

In one embodiment, the inlet section 84 includes a hose connector 96. The hose connector 96 can be a barb 98 or other structure on the outer circumference 99 thereof to increase the friction fit between the hose 16 and the connecting device 10. In this embodiment, the barb 98 includes three radial protrusions or projections 98a-98c that project radially outwardly and in the direction of the passage 92. These projections 98a-98c can increase the friction between the connecting device 10 and the hose 16. It is noted that the hose connector 96 can be any suitable structure that would enable the hose 16 to connect to the connecting device 10 in any suitable manner.

In one embodiment, the outlet section 88 includes a nozzle connector 100, such that the passage 92 extends from the hose connector 96 to the nozzle connector 100. The nozzle connector 100 can be quick release mechanism from the connecting device 10, that for example, comprises one, two or more wings 80 and 82 configured to actuate a retaining or releasing function of the nozzle connector 100. As shown in FIGS. 2 and 4-8, this embodiment includes first wing 80 and second wing 82 disposed 180 degrees from the first wing 80. The wings 80 and 82 are each coupled to a projection 102 and 104 and movement of a respective wing induces a radial movement of the projection 102 and/or 104 coupled thereto to actuate a retaining or releasing function of the nozzle connector 100.

Figure 8:
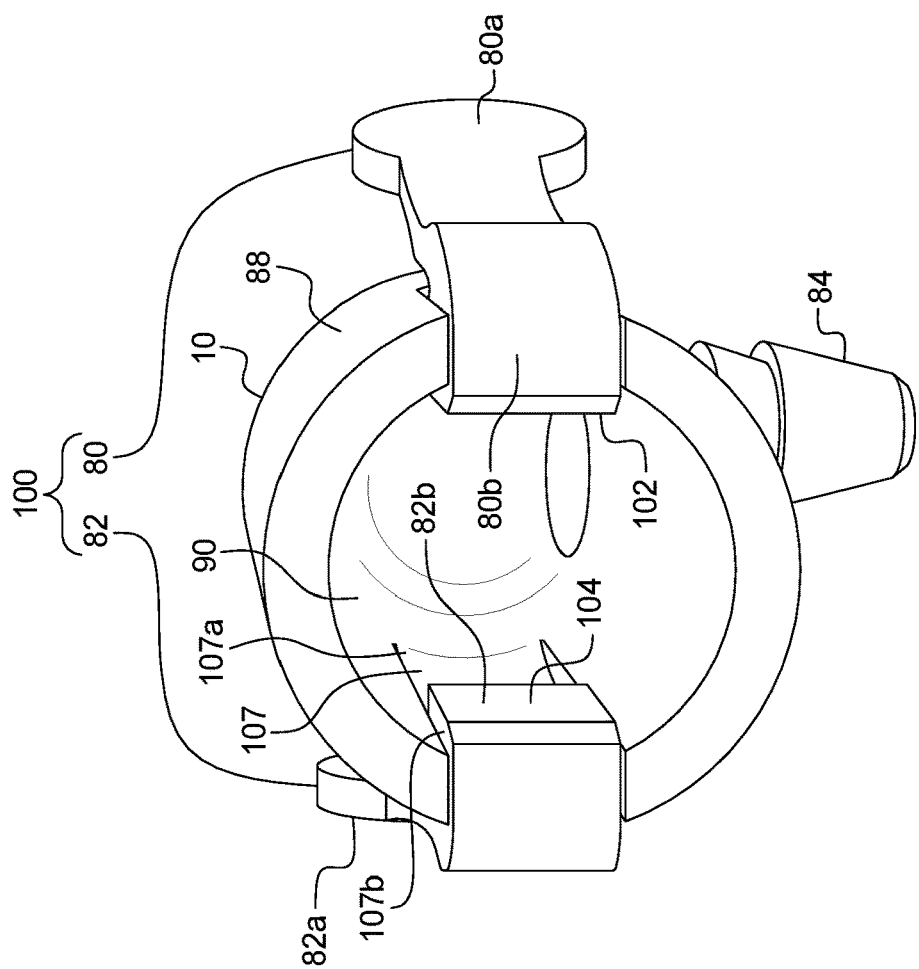
FIG. 8 is a front view of the connecting device of FIG. 7 with the wings in a rest position.
Figure 7:
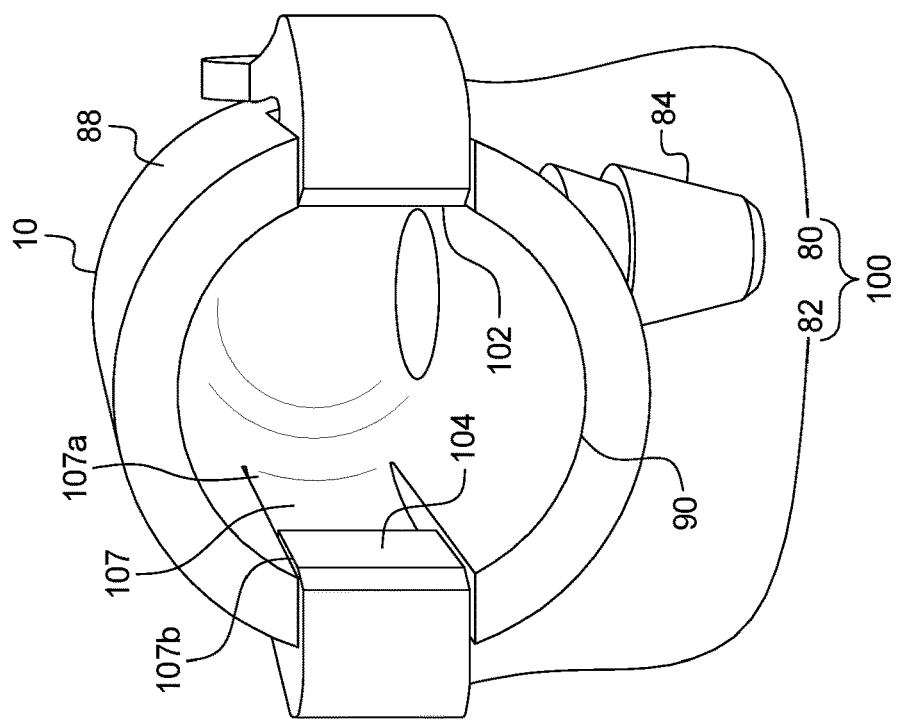
FIG. 7 is a front view of the connecting device of FIG. 6 with the wings in a depressed position.

That is, as shown in FIG. 6-8, the projections 102 and 104 can be formed in the surface of the outer section 88. Thus, for example, projections 102 and 104 (as shown in FIG. 6) are disposed on a flexible members 105 and 107 that have a proximal end 105a and 107a connected to the outlet section 88 and a distal end 105b and 107a free of the outlet section 88. The sides of the flexible members 105 and 107 between the distal ends 105b and 107b and the proximal end 105a and 107b are free from and separated from the outlet section 88, forming a gap G therebetween. The distal ends 105b and 107b are respectively connected to or include the projections 102 and 104 that extend into the passage 92 and are configured to engage the spray nozzle 12.

The wings 80 and 82 have a distal end 80a and 82a and a proximal end 80b and 82b. The proximal ends 80b and 82b are respectively connected to projection 102 and 104 that extends into the passage 92 and are configured to engage the spray nozzle 12. Thus, the wings 80 and 82 are spring loaded such that the projections 102 and 104 are biased radially inwardly. This configuration enables the wing 80 an 82 and the projections 102 and 104 to flex inwardly and outwardly for connection and removal from the mixer 14. As shown in FIG. 7, upon actuation of the wings 80 and 82 by applying pressure to the distal ends 80a and 82b, the projections 102 and 104 are moved radially outwardly and the connecting device 10 can be released from or coupled to the spray nozzle 12.

In one embodiment, the hose connector 96 (and/or inlet section 84) is arranged at an angle selected in the range of 30° to 60°, preferably 40° to 50°, and more preferably of 45°, with respect to the nozzle connector 100 (and/or outlet section) 88. However, it is noted that the angle can be any suitable or desired angle.

In one embodiment, the connecting device 10 can be 3D printed using a 3D printer P. 3D printing refers to a process in which material is joined or solidified under computer control to create a three-dimensional object, with material being complied to form the desired object. In some embodiments, a computer can refer to a smart phone, a tablet, a printer motherboard, a processor/computer in the printer, or any other device with a processor or an electronic controller. The material for the connecting device 10 can be any material, such as liquid molecules or powder grains being fused together. In some embodiments, the connecting device 10 can be printed from one or more materials such as PA12, polypropylene, and/or glass filled polyamide. However, the material can be any suitable material or materials.

It is noted that, in one embodiment, the connecting device 10 can be a 2K injection molded part, be 3D printed and/or can have a plastic material having a shore D hardness selected in the range of 50 to 80.

Once the connecting device 10 is 3D printed or formed in any other suitable manner, the connecting device 10 can be coupled to or connected to the hose 16 and/or the spray nozzle 12. As shown in FIGS. 9 and 10, the inlet section 84 can be connected to the hose 16. In one embodiment, the inlet section 84 is inserted into an interior passage 106 of the hose 16. The hose 16 can be formed from a pliable material (such as rubber) that enables some stretching or expansion of the internal diameter of the interior passage 106 of the hose 16. This stretching of the hose 16, along with the relative diameter dimensions of the inlet section 84 (e.g., the barb 98 on the inlet section 84) and the internal diameter of the hose 16 causes the connecting device 10 to be securely attached to the hose 16.

The outlet section 88 of the connecting device 10 can be coupled to the spray nozzle. As shown in FIG. 9, the outlet opening 90 in the connecting device 10 is sized and configured to except the connecting element 54. As the connecting element 54 of the spray nozzle 12 is inserted into the outlet opening 90, the protrusions 102 and 104 are expanded radially outwardly. Once the connecting device 10 is fully inserted onto the connecting element 54, the protrusions 102 and 104 are biased radially inwardly and project into the recess 67 and engage the shoulder 70 of the connecting element 54, as shown in FIG. 10.

Thus, in operation, the dispenser D can be loaded with the desired cartridge or cartridges 32, and connected to a pressurized gas supply or tank T. Upon activation of the trigger, the pressurized gas applies pressure to the piston 42, which in turn moves the shuttles 44a and 44b. The shuttles 44a and 44b compress the ends of the cartridges 32, which push the compounds out of the outlets into the mixer 14. The mixing elements 108 in the mixer 14 mix the compounds. The mixed compound exits the mixer 14 and enters the spray nozzle 12. Simultaneously or substantially simultaneously, the pressurized gas passes through the gas line 38, the hose 16 and the connecting device 10 and enters the spray nozzle 12. The spray nozzle 12 imparts a swirling or rotating motion to the pressurized gas which mixes with the mixed compound to form an atomized spray which can be applied as desired.

Second Embodiment

Figure 11:
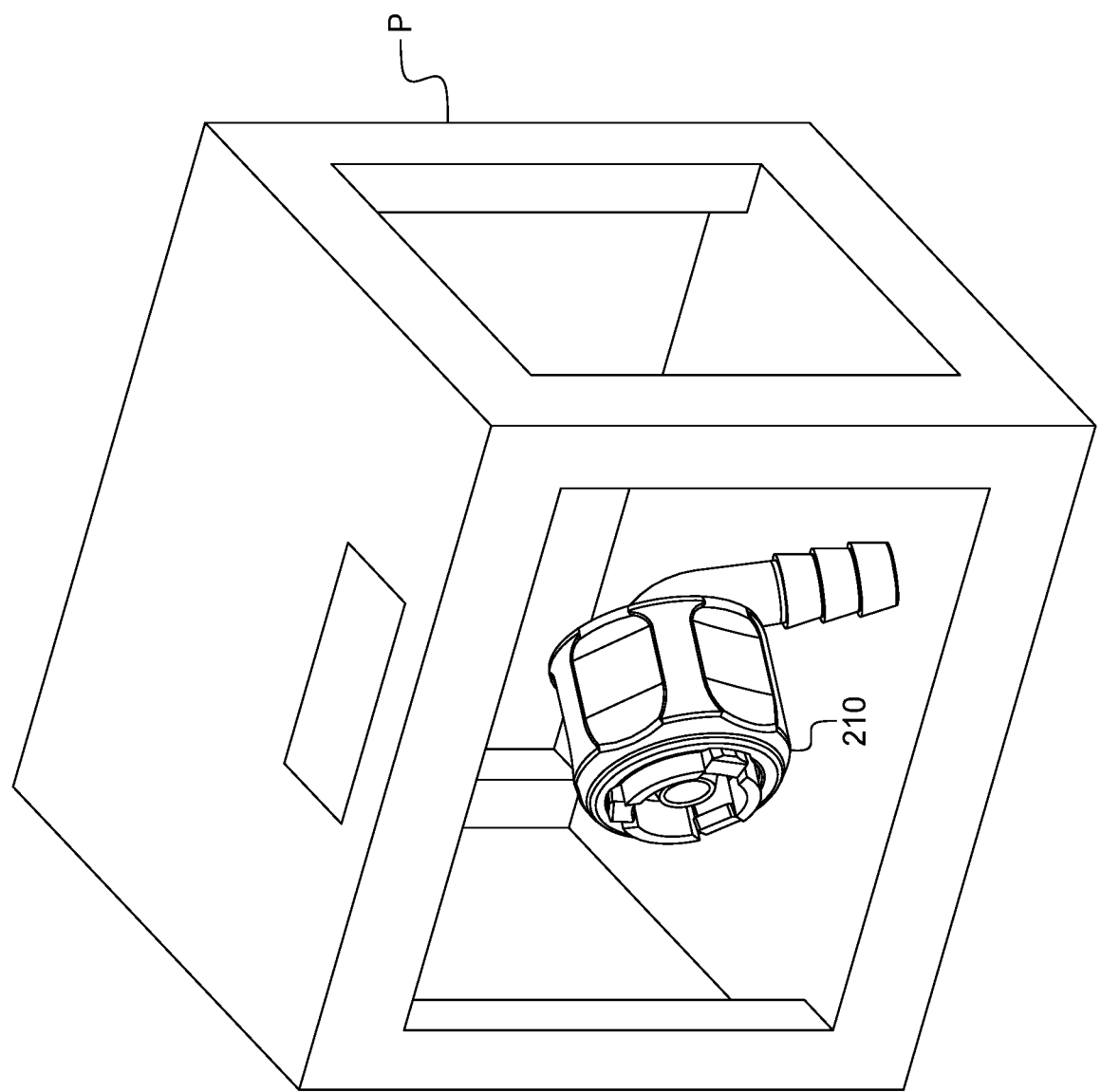
FIG. 11 is a top perspective view of a second embodiment of the present invention being 3D printed by a 3D printer.
Figure 12:
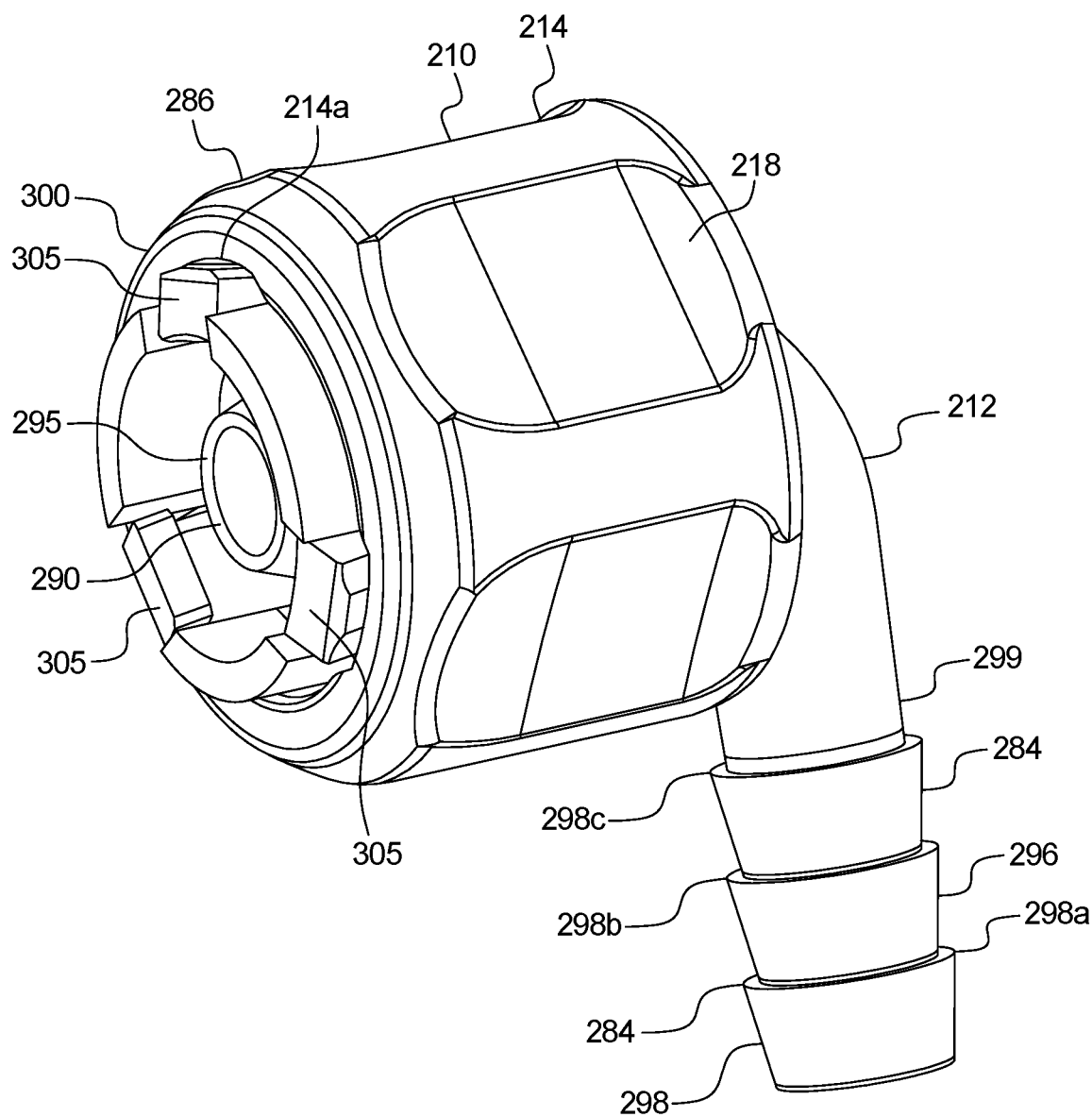
FIG. 12 is a top perspective view of the connecting device of FIG. 11.
Figure 13:
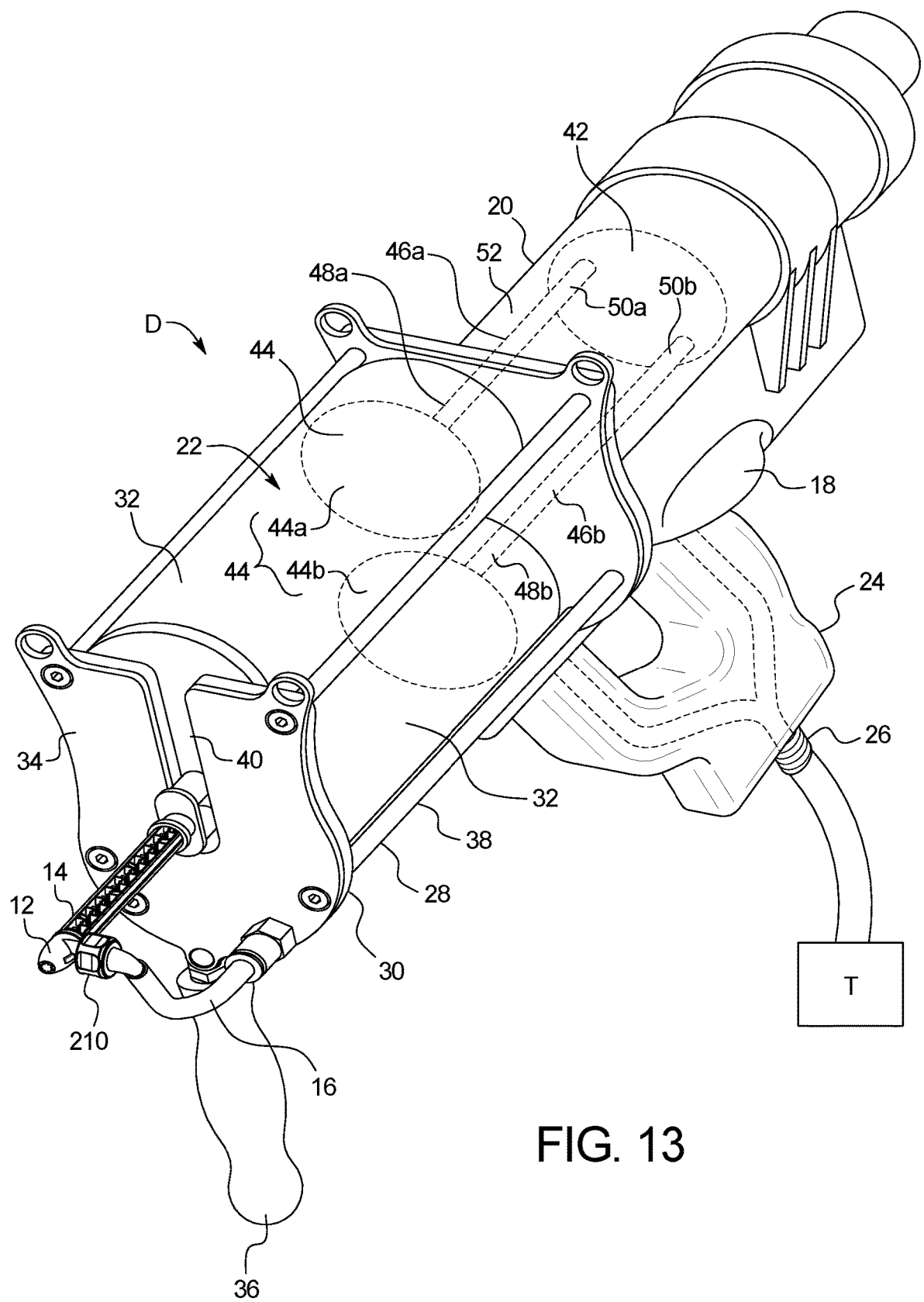
FIG. 13 is a top perspective view of a spray device that includes the connecting device of FIG. 12.

A connecting device 210 according to a second embodiment is illustrated in FIGS. 11-22. Similarly to FIG. 1, FIG. 11 illustrates the connecting device 210 being printed by a 3D printer P. Although the connecting device 210 is shown being printed by a 3D printer, it is noted that the connecting device 210 can be formed in any suitable manner. FIG. 12 illustrates the connecting device 210 after completion of 3D printing or other suitable manner. As shown in FIG. 13, the connecting device 210 is configured to connect the first component (e.g., the spray nozzle 12) with the second component (e.g., the hose 16) in the dispenser D. The connecting device 210 can be plastic or any suitable material. As shown in FIGS. 12 and 14-16, the connecting device 210 can be elbow shaped and of two-piece design with a hose connector 296 and a nozzle connector 300. However, it is noted that the connecting device 210 can be formed from any number of pieces desired and from any suitable material. The connecting device 210 can include an inlet section 284 and an outlet section 286 with a quarter turn coupling.

Figure 16:
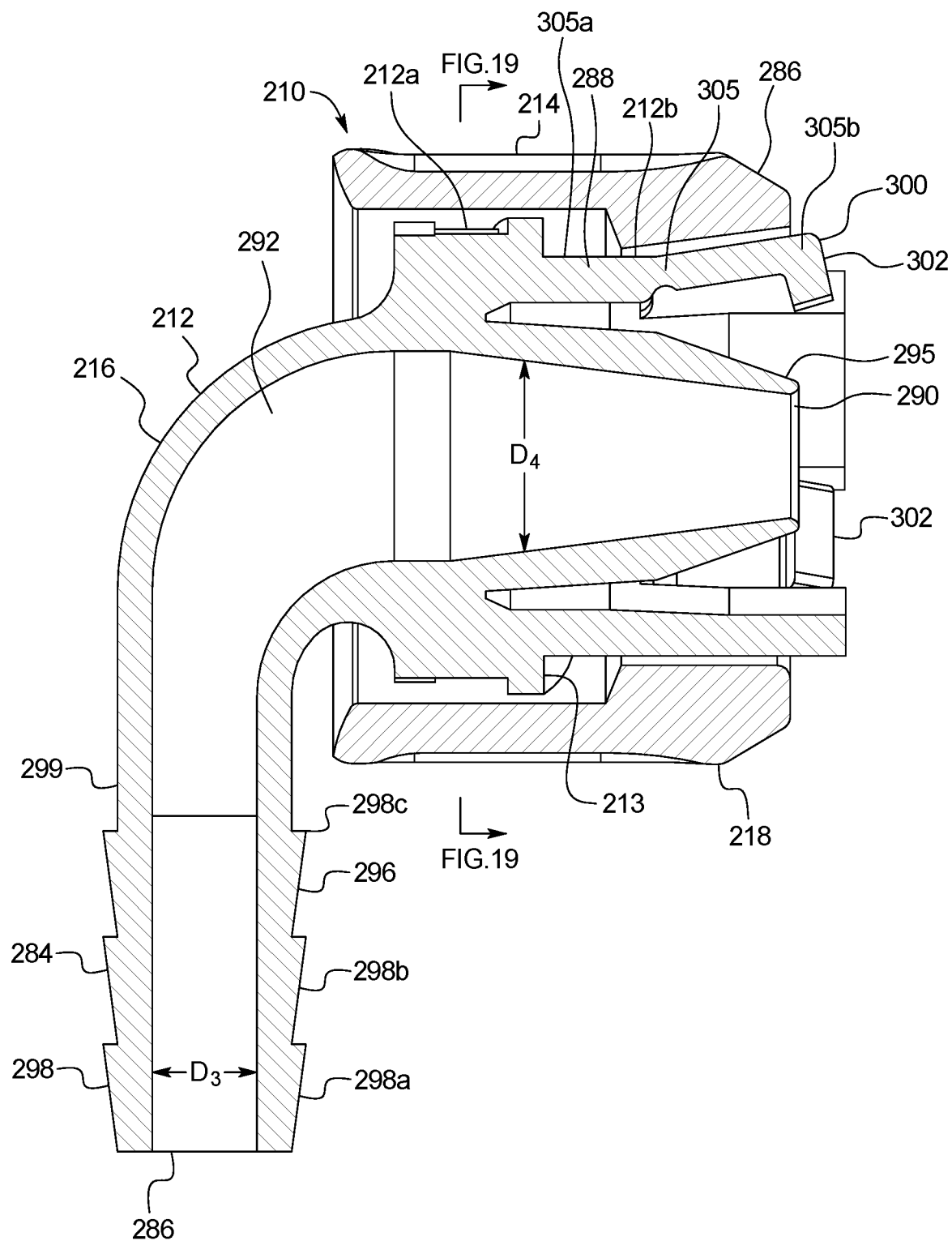
FIG. 16 is a side view in section of the connecting device of FIG. 15 taken along lines 16-16.

As shown in FIGS. 14-16, the connecting device 210 preferably includes a base member 212 and a rotational member 214. The base member 212 includes the inlet section 284 with an inlet opening 286 and the rotational member 214 is disposed at (or in some embodiments defines) the outlet section 288 which includes an outlet opening 290. Similarly to the first embodiment, a passage 292 extends from the inlet opening 286 to the outlet opening 290. It is noted that that the connecting device 210 can include a plurality of inlet openings and outlet openings and a plurality of passages, if desired. The base member 212 has an elbow bend 216. The elbow bend 216 preferably enables the hose 296 connector to be arranged at an angle of about 90° with respect to the nozzle connector 300. However, it is noted that the angle can be any suitable or desired angle.

As shown in FIG. 16, the passage 292 has a first diameter $D_3$ at the inlet section 284 and a second diameter $D_4$ at the outlet section 288. The diameter $D_4$ can be larger than the diameter $D_3$.

The nozzle connector 300 can be quick release mechanism of the connecting device 210, that for example, comprises one, two, three or more flexible members 305 configured to perform a retaining or releasing function of the nozzle connector 300. In one embodiment, the connecting device 210 includes three flexible members 305 disposed 120 degrees from each adjacent flexible member 305. The flexible members 305 are each coupled to a projection 302 and movement of a flexible members 305 induces a radial movement of the projections 302 coupled thereto to actuate a retaining or releasing function of the nozzle connector 300. The flexible members 305 can be flared outwardly such that engagement thereof biases the projections 302 inwardly. As shown in FIG. 16, the base member 212 can include an interior nozzle portion 295 disposed within the nozzle connector 300.

Figure 17:
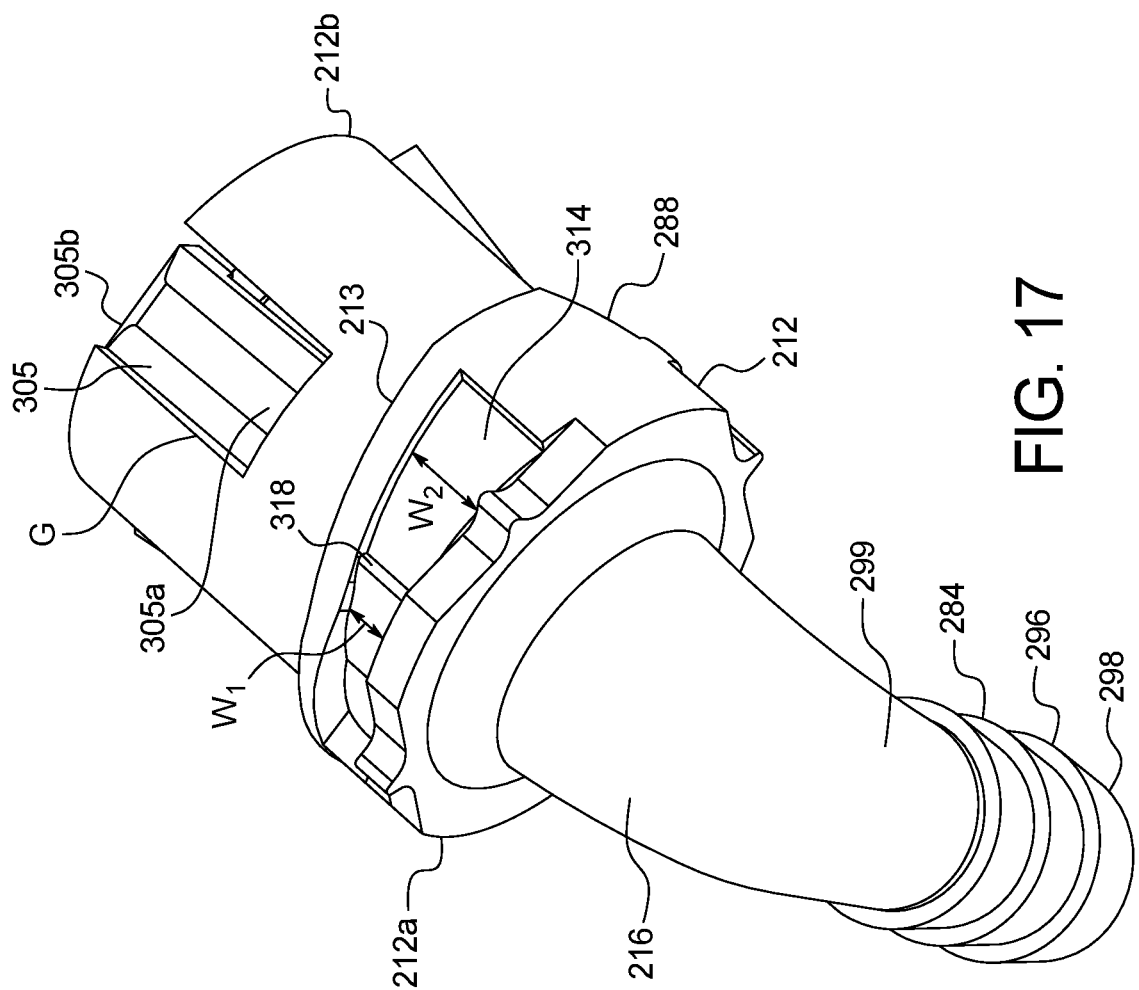
FIG. 17 is a top perspective view of the connecting device of FIG. 15 with the outer ring removed.
Figure 20:
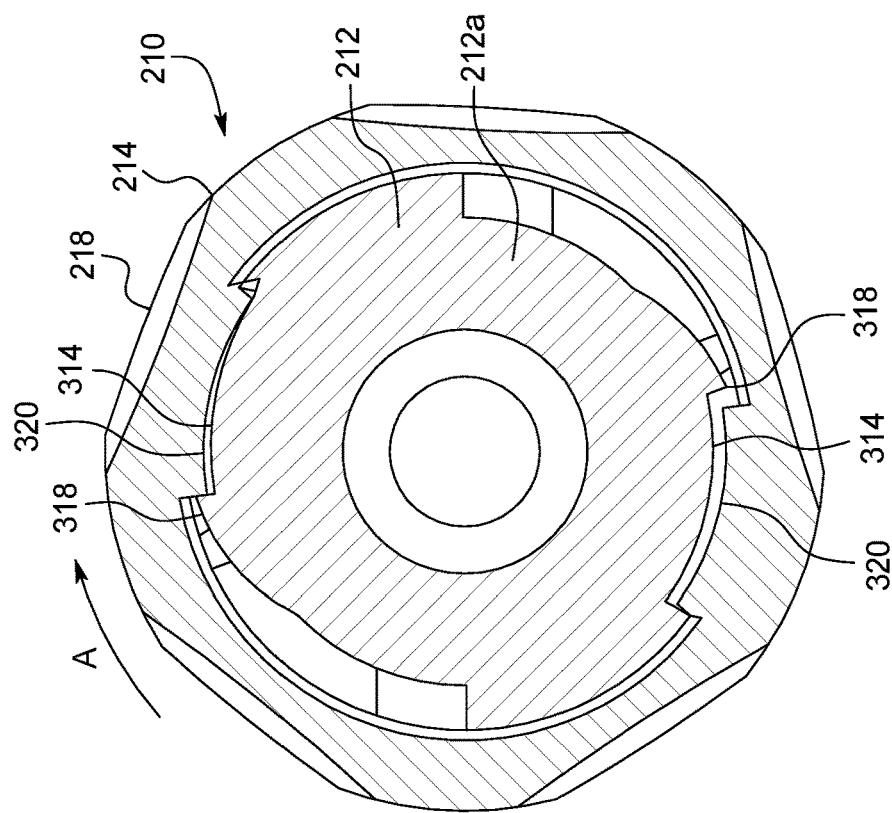
FIG. 20 is a sectional view of the connecting device of FIG. 19 being coupled to a spray nozzle.
Figure 19:
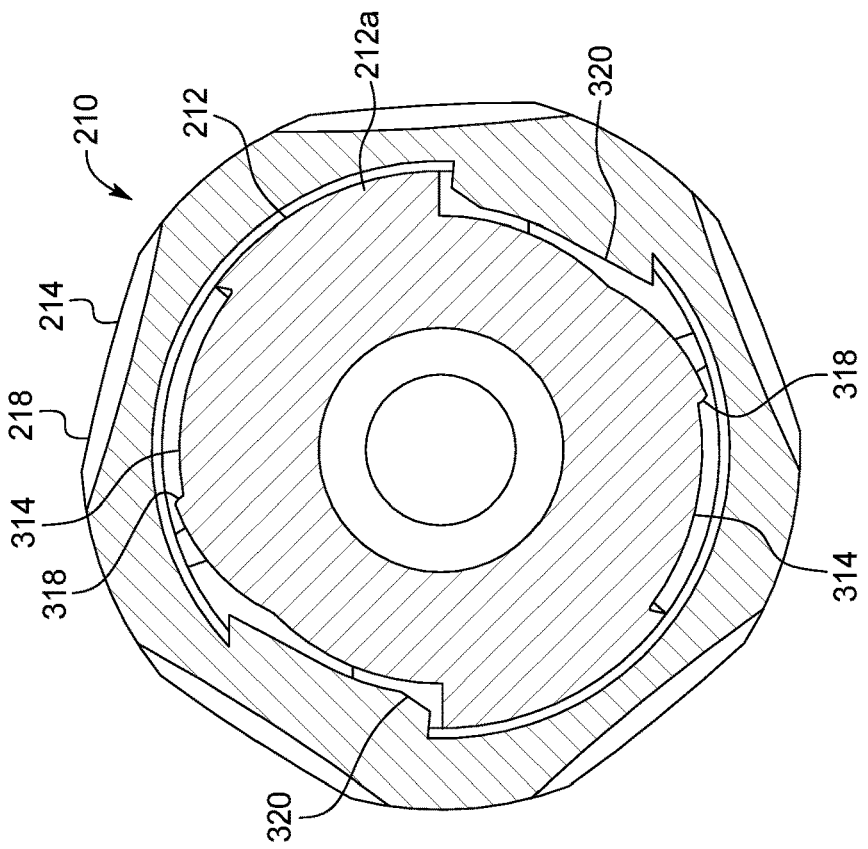
FIG. 19 sectional view along lines 19-19 in FIG. 15 of the coupling device uncoupled from the spray nozzle.

As shown in FIGS. 16 and 17, the flexible members 305 can be formed in the surface of the outer section 288. Thus, for example, projections 302 are disposed on the flexible members 305 that have a proximal end 305a connected to the outlet section 288 and a distal end 305b free of the outlet section 288. The sides of the flexible members 305 between the distal ends 305b and the proximal ends 305a are free from and separated from the outlet section 288, forming a gap G therebetween. The distal ends 305b are respectively connected to or include the projections 302 that are configured to engage the spray nozzle 12.

As shown in FIGS. 16 and 17, the outlet section 288 of the base member 212 includes a first portion 212a and a second portion 212b. The external diameter of the second portion 212b is less than the external diameter of the second portion 212. Thus a wall 213 is formed therebetween. As shown in FIG. 17, the wall 213 is angled in the circumferential direction. The second portion 212a includes a groove or a travel path 314 on the outer surface thereof. The groove 314 extends at least partially circumferentially around the outer surface of the outlet section 288 (e.g., about 90 degrees or a quarter turn). The groove 314 at a first has a width $W_1$ that is less than a width $W_2$ at a second part. Furthermore, the groove 314 can have a locking shoulder 318 the second part.

The rotational member 314 and/or the flexible members 305 and/or the protrusions 302 can be the nozzle connector 300 and can comprise a ring 218 capable of being rotated relative to the base member 212 to contact the flexible members 305. In one embodiment, the nozzle connector 300 is a quarter turn quick connect connecting device.

Figure 18:
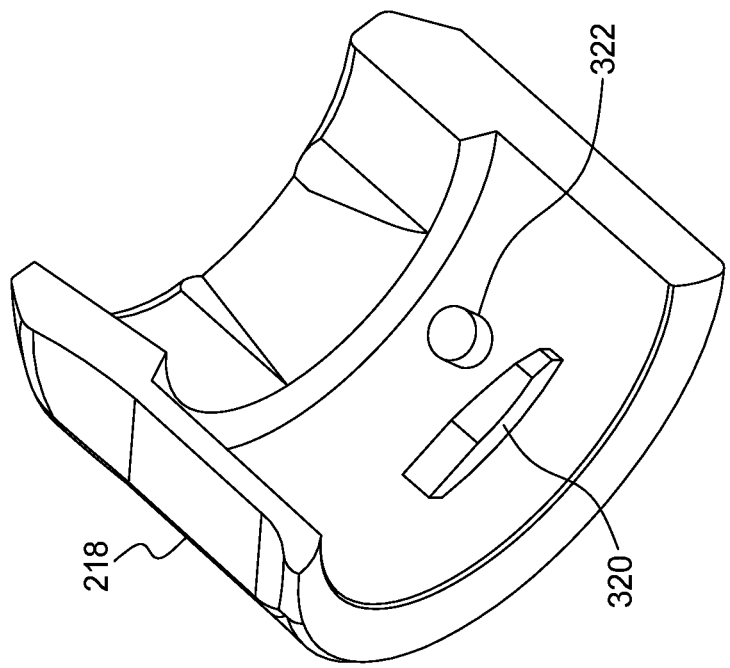
FIG. 18 is a perspective view in section of the outer ring of the connecting device of FIG. 15.

As shown in FIG. 18, an interior surface of the ring 218 can include a first protrusion (tongue) 320 and a second protrusion (guide pin) 322. The first protrusion 320 is capable of being inserted into the groove 314 on the outlet section 288, and the second protrusion 322 is disposed externally of the groove 314 and abuts the wall 213.

It is noted that the base member 212 can include a plurality of grooves 314 (e.g., two grooves) with one groove offset about 180 degrees on the base member from the other groove. Moreover, the ring 218 can include a plurality of first protrusions (tongue) 320 and a second protrusions (guide pin) 322 with one first protrusion and second protrusion offset about 180 degrees on the base member from the other first protrusion and second protrusion.

As shown in FIGS. 17-20, when the protrusions 320 are disposed with the grooves 314, several tight tolerances exits, which create print positions in the 3D printer, but also allow for free rotational motion. Thus, when the ring 218 is rotated in the direction of arrow A, the wall 213 causes or biases the second protrusion 322 to traverse in the longitudinal direction of the connecting device 210. This causes the ring 218 to bias the flexible members 305 radially inwardly. Moreover, the first protrusion 320 is rotated relative to the base member 212 until the first protrusion 320 engages the locking shoulder 318 to lock the ring 218 in position.

Figure 21:
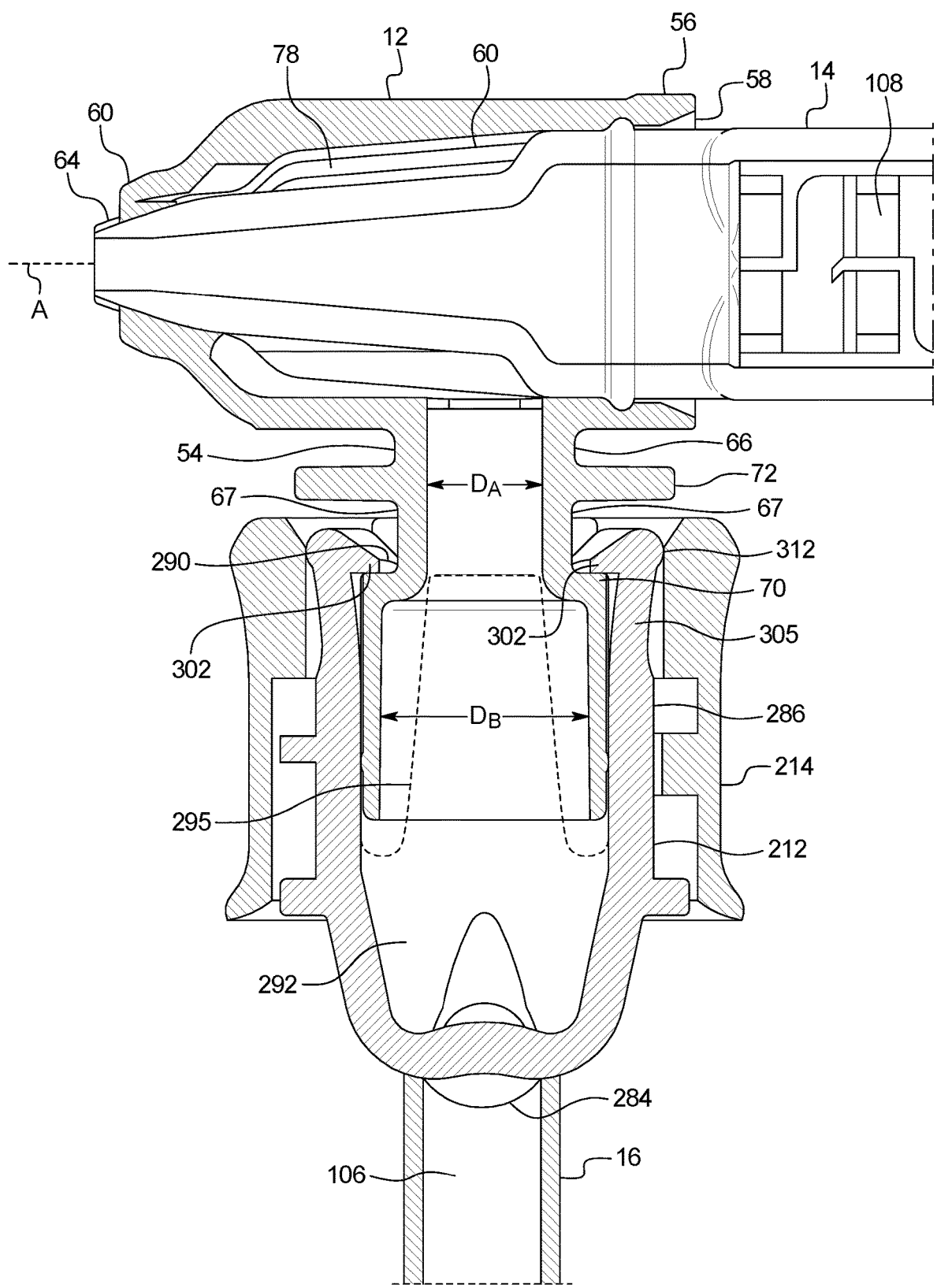
FIG. 21 is a top view in section of the connecting device of FIG. 12 coupled to the spray nozzle.
Figure 22:
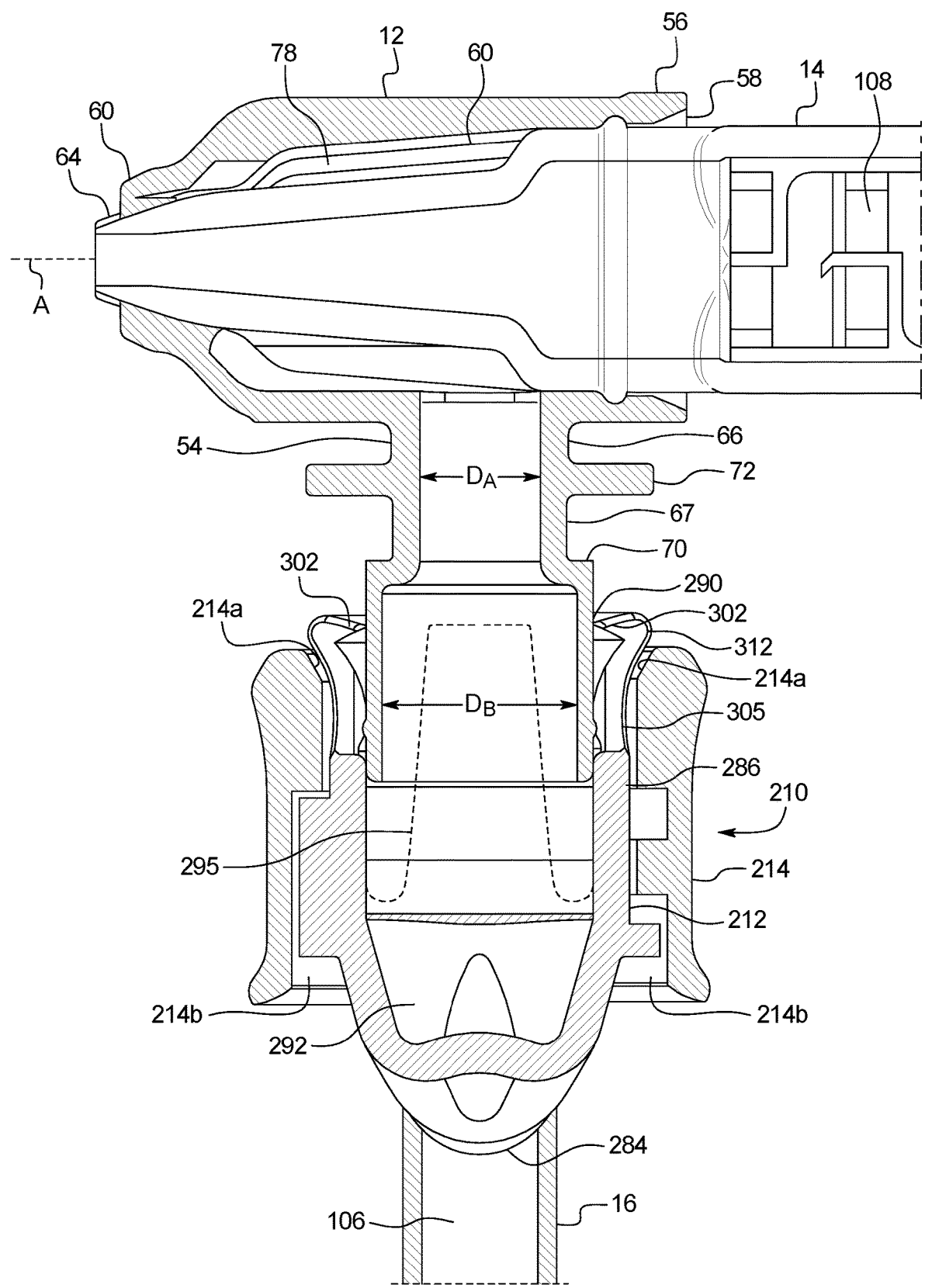
FIG. 22 is a top view in section of the connecting device of FIG. 21 being uncoupled from the spray nozzle.

As shown in FIGS. 16, 21 and 22, the inlet section 284 preferably is sized and configured to fit within the hose 16 with an interference fit. Thus, the inlet section 284 can have an external diameter that is the same as or substantially similar to the internal diameter of the hose 16. In one embodiment, the inlet section 284 includes the hose connector 296. The hose connector 296 can be a barb 298 or other structure on the outer circumference 299 thereof to increase the friction fit between the hose 16 and the connecting device 210. In this embodiment, the barb 298 includes three radial protrusions or projections 298a-298c that project radially outwardly and in the direction of the passage 292. These projections 298a-298c can increase the friction between the connecting device 210 and the hose 16.

It is noted that the hose connector 296 can be any suitable structure that would enable the hose 16 to connect to the connecting device 210 in any suitable manner.

The connecting device 210 can be 3D printed using the 3D printer P. 3D printing refers to a process in which material is joined or solidified under computer control to create a three-dimensional object, with material being complied to form the desired object. In some embodiments, a computer can refer to a smart phone, a tablet, a printer motherboard, a processor/computer in the printer, or any other device with a processor or an electronic controller. The material for the connecting device 210 can be any material, such as liquid molecules or powder grains being fused together. In some embodiments, the connecting device 210 can be printed from one or more materials such as PA12, polypropylene, and/or glass filled polyamide. However, the material can be any suitable material or materials.

It is noted that the connecting device 210 can be a 2K injection molded part, be 3D printed and/or can have a plastic material having a shore D hardness selected in the range of 50 to 80.

Once the connecting device 210 is 3D printed or formed in any other suitable manner, the connecting device 210 can be coupled to or connected to the hose 16 and/or the spray nozzle 12. As shown in FIGS. 21 and 22, the inlet section 284 can be connected to the hose 16. In one embodiment, the inlet section 284 is inserted into an interior passage 106 of the hose 16. The hose 16 can be formed from a pliable material (such as rubber) that enables some stretching or expansion of the internal diameter of the interior passage 106 of the hose 16. This stretching of the hose 16, along with the hose connector 296 (e.g., the barb 298) on the inlet section 284 causes the connecting device 210 to be securely attached to the hose 16.

The outlet section 286 of the connecting device 210 can be coupled to the spray nozzle 12. As shown in FIGS. 21 and 22, the outlet opening 290 in the connecting device 210 is sized and configured to except the connecting element 54. The interior nozzle portion 295 can be sized and configured to fit within the interior of the second portion 68 of the connecting portion 54. Thus the exterior diameter of the interior nozzle portion 295 can have a diameter that is less than the second diameter $D_B$ of the second portion.

The rotational member 214 is then rotated a quarter turn with the second protrusion 322 guiding the ring 218 along the outlet section 288. Since the wall 213 of the first portion 212a is inclined in the longitudinal direction toward the outlet opening, the ring 214 is moved toward the outlet opening. The interior surface of the ring 218 contacts the the flexible members 305 as the ring 214 slides longitudinal in the direction of the outlet opening 290, causing the protrusions 302 of the flexible members 305 to be biased radially inwardly and project into the recess 67 and engage the shoulder 70 of the connecting element 54. The first protrusion 320 can then engage the locking shoulder 318 to lock the ring 218 in place and sealing connect to the connecting device 210 to the spray nozzle 12. The connecting device 210 can be removed by reversing this operation, if desired. As shown in FIG. 22, when the projections 302 are expanded outwardly, they can be accommodated in relief portions 214a of the ring 214.

Thus, in operation, the dispenser D can be loaded with the desired cartridge or cartridges 32, and connected to a pressurized gas supply or tank T. Upon activation of the trigger, the pressurized gas applies pressure to the piston 42, which in turn moved the shuttles 44a and 44b. The shuttles 44a and 44b compress the ends of the cartridges 32, which push the compounds out of the outlets into the mixer 14. The mixing elements 108 in the mixer 14 mix the compounds. The mixed compound exits the mixer 14 and enters the spray nozzle 12. Simultaneously or substantially simultaneously, the pressurized gas passes through the gas line 38, the hose 16 and the connecting device 210 and enters the spray nozzle 12. The spray nozzle 12 imparts a swirling or rotating motion to the pressurized gas which mixes with the mixed compound to form an atomized spray which can be applied as desired.

Additionally, as shown in FIG. 22, the ring 214 can have drain ports 214b to enable excess material to be evacuated from the connecting device 210.

The embodiments disclosed herein provide an improved device to connect the hose and the spray nozzle (or any suitable components) in a dispenser or other device. The connecting device 210 is relatively simple and cost efficient to produce.

Third Embodiment

Figure 23:
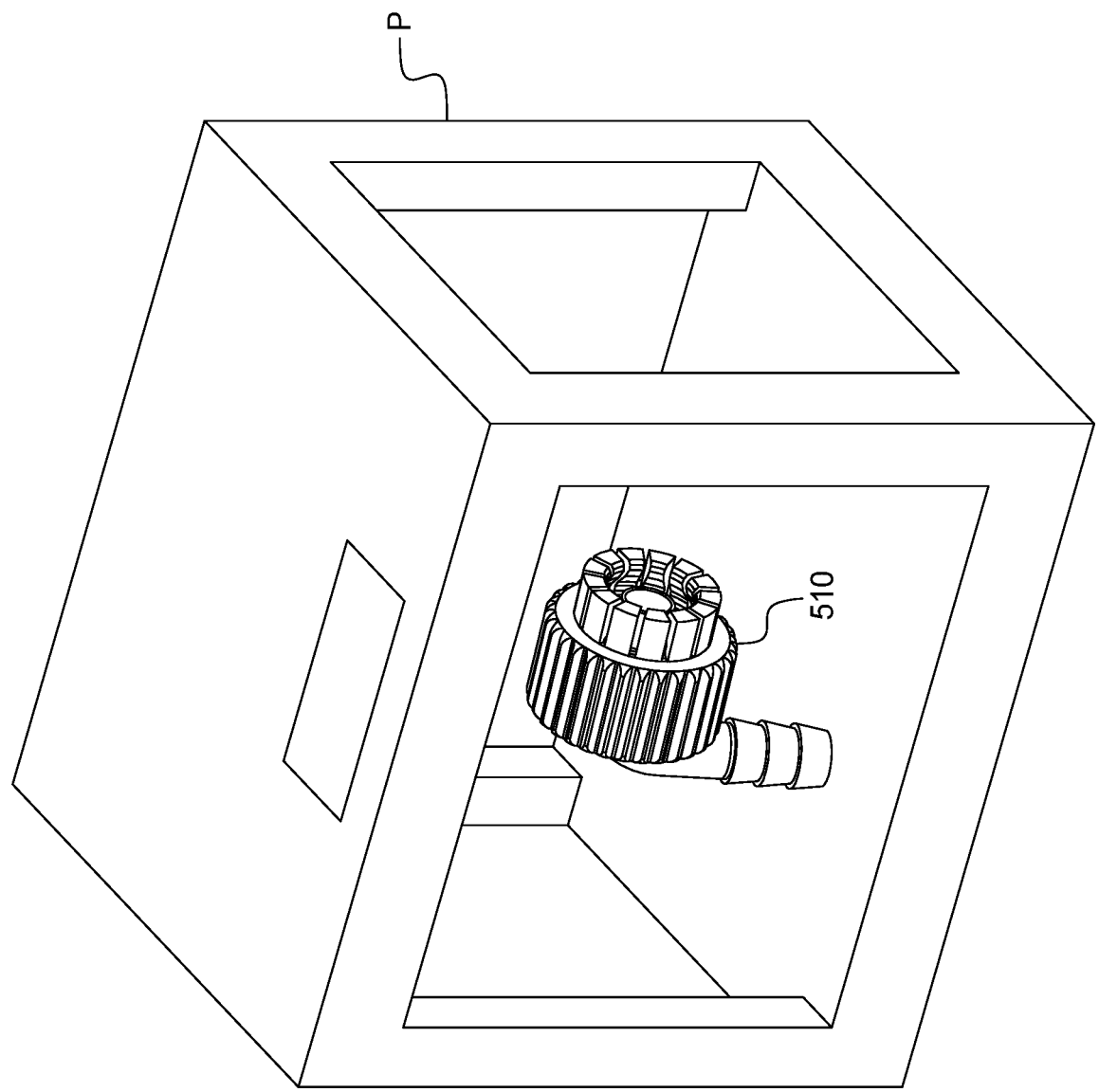
FIG. 23 is a top perspective view of a third embodiment of the present invention being 3D printed by a 3D printer.
Figure 24:
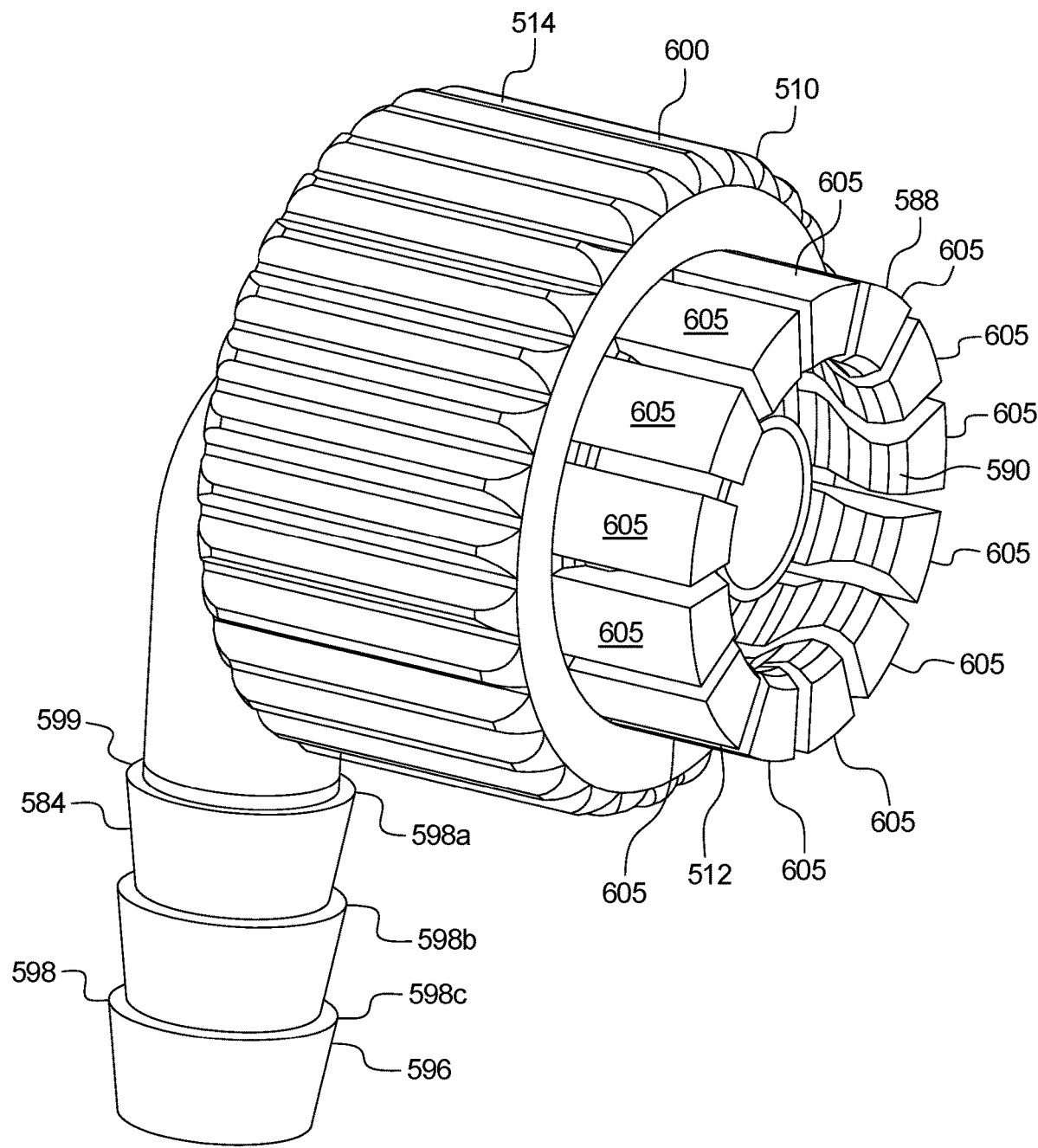
FIG. 24 is a top perspective view of the connecting device of FIG. 23.
Figure 25:
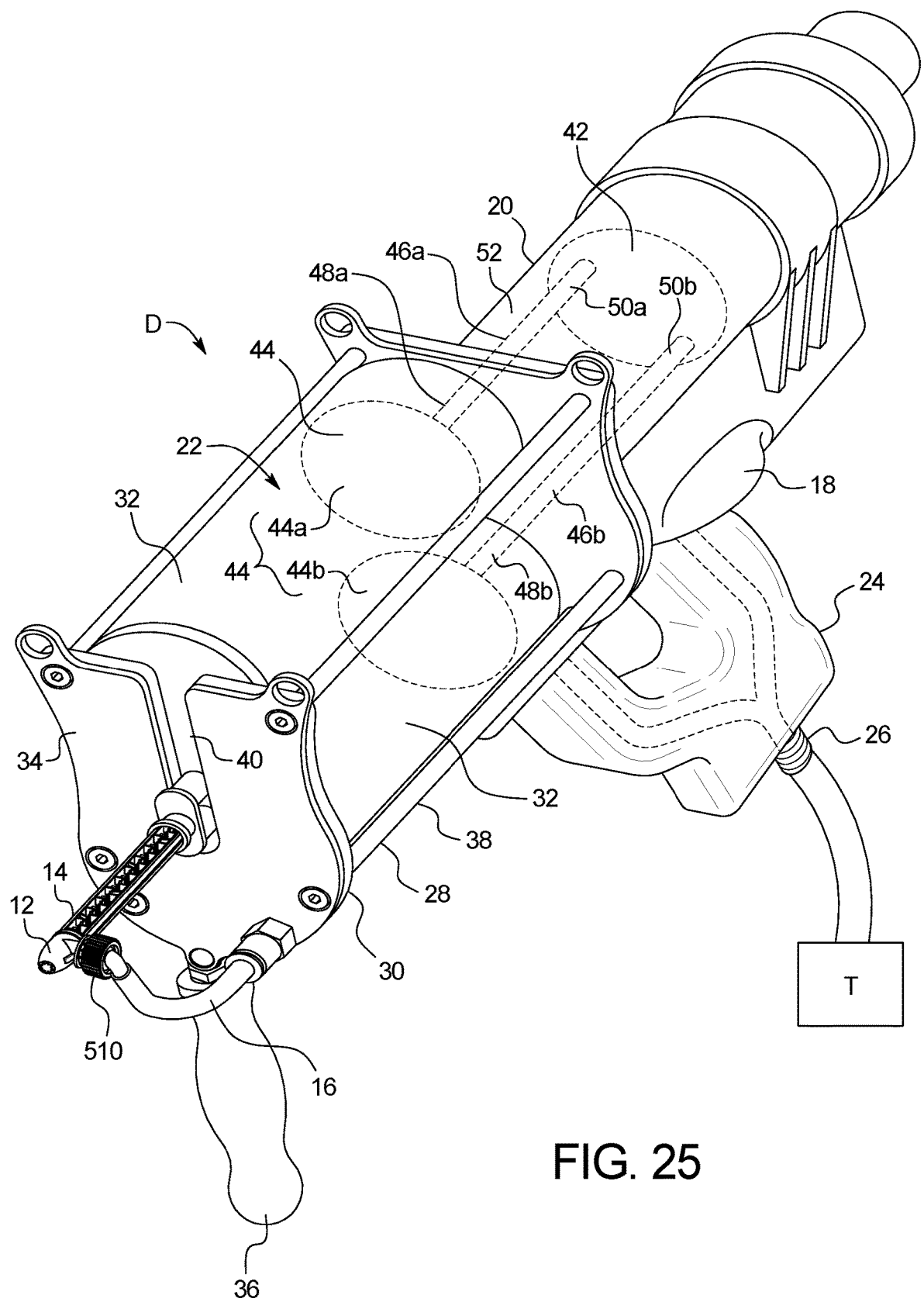
FIG. 25 is a top perspective view of a spray device that includes the connecting device of FIG. 24.

A connecting device 510 according to a third embodiment is illustrated in FIGS. 21-30. Similarly to FIG. 1, FIG. 23 illustrates the connecting device 510 being printed by a 3D printer P. Although the connecting device 510 is shown being printed by a 3D printer, it is noted that the connecting device 510 can be formed in any suitable manner. FIG. 24 illustrates the connecting device 510 after completion of 3D printing or other suitable manner. As shown in FIG. 25, the connecting device 510 is configured to connect the first component (e.g., the spray nozzle 12) with the second component (e.g., the hose 16) in the dispenser D. The connecting device 510 can be plastic or any suitable material.

Figure 26:
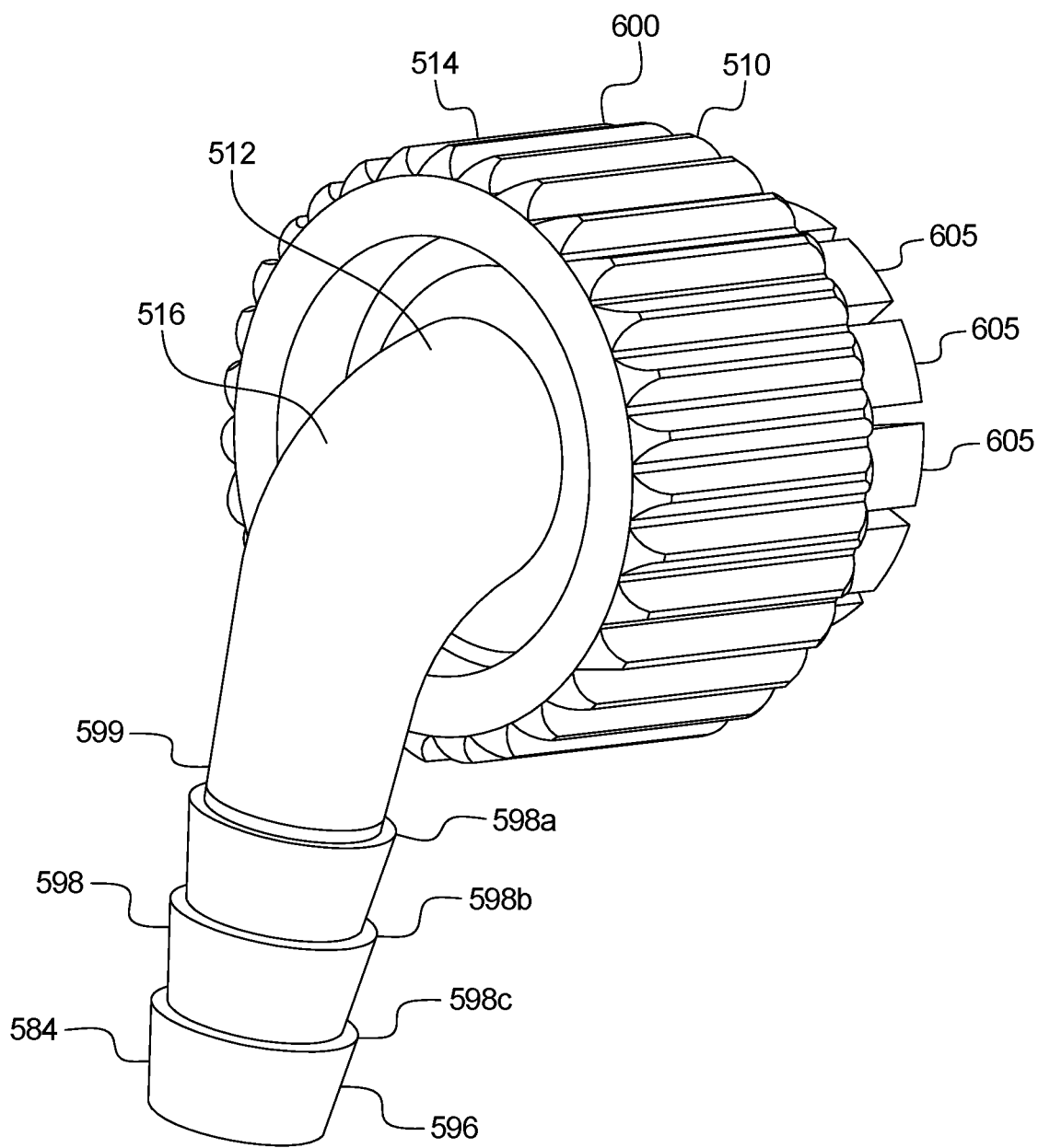
FIG. 26 is rear perspective view of the view of the connecting device of FIG. 24.
Figure 27:
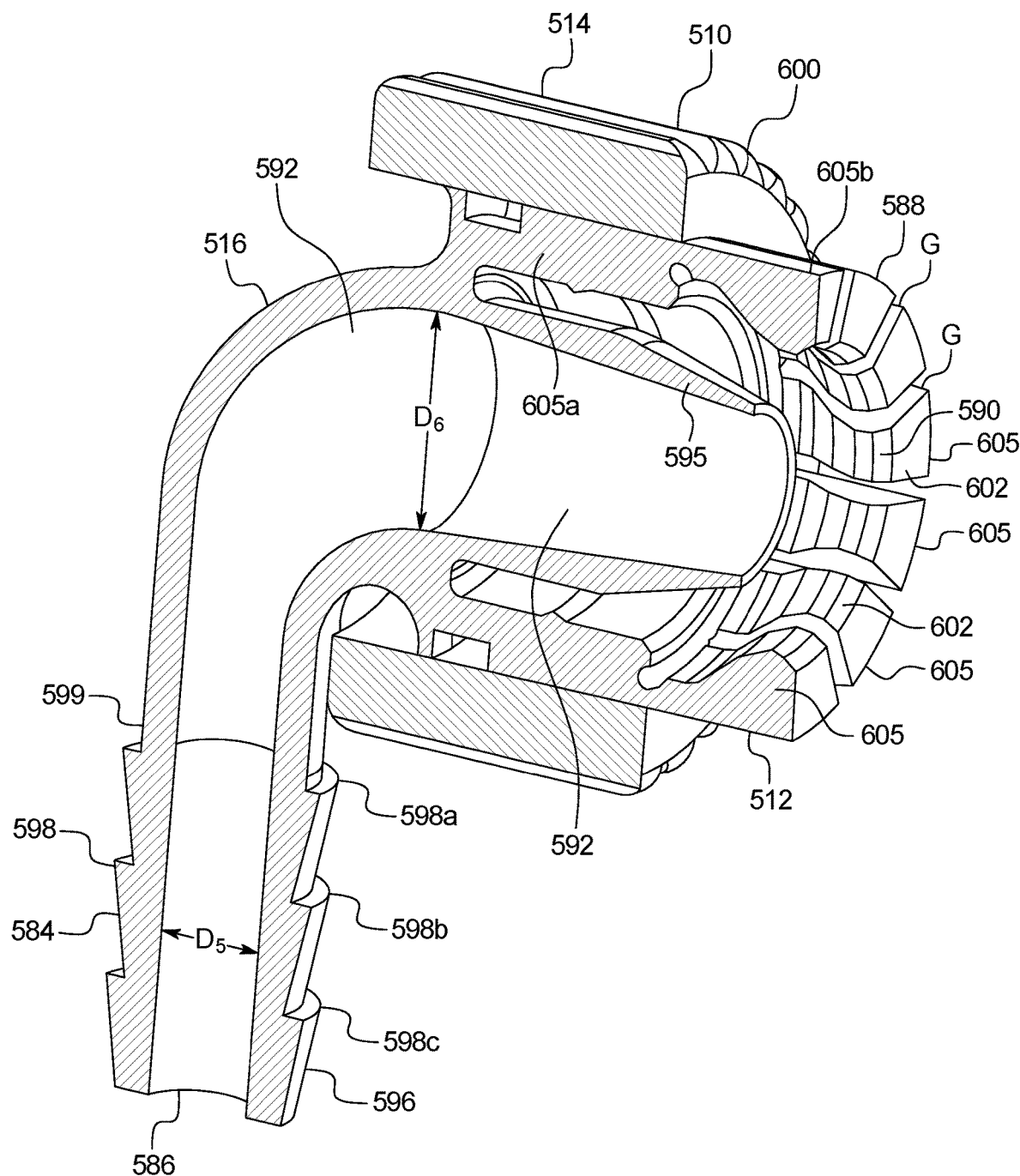
FIG. 27 is a cross sectional view of the connecting device of FIG. 24.
Figure 28:
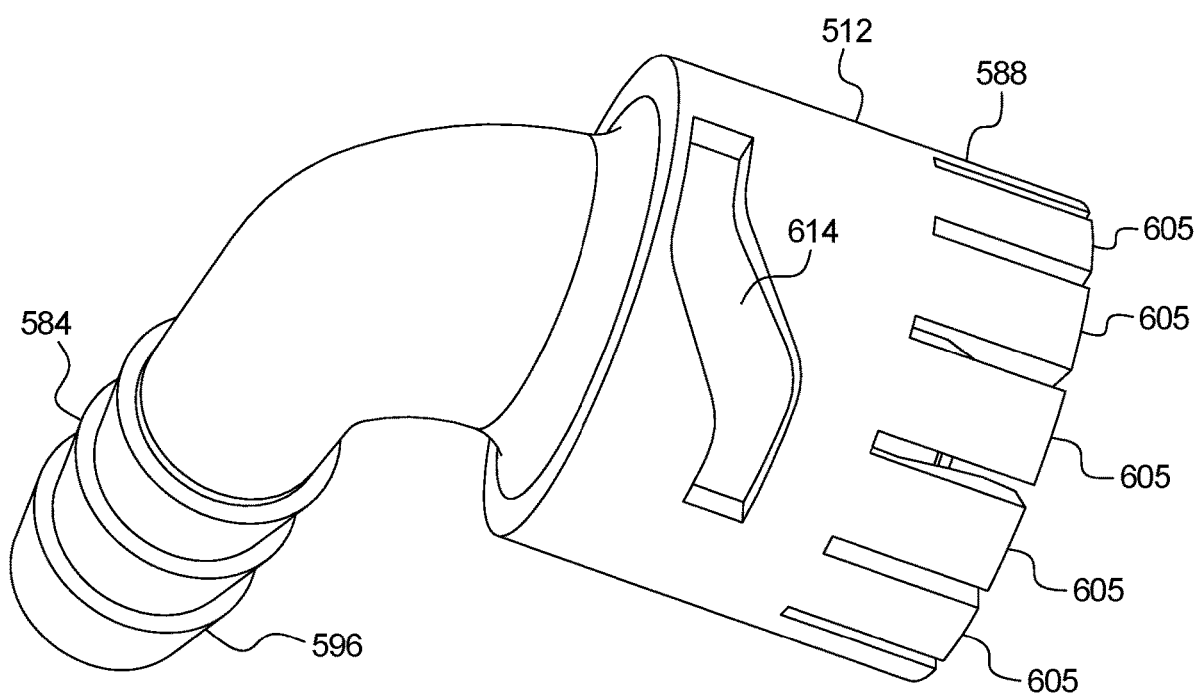
FIG. 28 is a top view of the connecting device of FIG. 24 with the outer ring removed.

As shown in FIGS. 24, 26 and 27, the connecting device 510 can be elbow shaped and of two-piece design with a hose connector 596 and a nozzle connector 600. However, it is noted that the connecting device 510 can be formed from any number of pieces desired and from any suitable material. The connecting device 510 preferably includes a base member 512 and a rotational member 514. The base member 512 includes the inlet section 584 with an inlet opening 586 and the rotational member 514 is disposed at or defines the outlet opening 590 of the outlet section 588. Similarly to the first embodiment, a passage 592 extends from the inlet opening 586 to the outlet opening 590. It is noted that that the connecting device 510 can include a plurality of inlet openings and outlet openings and a plurality of passages, if desired. The base member 512 has an elbow bend 516. The elbow bend 516 preferably enables the hose connector 596 to be arranged at an angle of about 90° with respect to the nozzle connector 600. However, it is noted that the angle can be any suitable or desired angle.

As shown in FIG. 27, the passage 592 has a first diameter $D_5$ at the inlet section 584 and a second diameter $D_6$ at the outlet section 588. The diameter $D_6$ can be larger than the diameter $D_5$.

The nozzle connector 600 can be a quick release mechanism for the connecting device 510, that for example, comprises a plurality of flexible members 605 (it is noted that if desired the connecting device can include one, two, three or more flexible members) configured to perform a retaining or releasing function of the nozzle connector 600. As shown in FIG. 24, this embodiment includes about thirteen flexible members 605 evenly spaced about the outlet opening 590. The flexible members 605 are each coupled to a projection 602 and movement of a flexible members 605 induces a radial movement of the projection 602 coupled thereto to actuate a retaining or releasing function of the nozzle connector 600. The flexible members 605 can be flared outwardly such that engagement thereof biases the projections 602 inwardly. As shown in FIG. 27, the base member 512 can include an interior nozzle portion 595 disposed within the nozzle connector 600.

As shown in FIG. 27, the flexible members 605 can be formed in the surface of the outer section 588. Thus, for example, projections 602 are disposed on a flexible members 605 that have a proximal end 605a connected to the outlet section 588 and a distal end 605b free of the outlet section 588. The sides of the flexible members 605 between the distal ends 605b and the proximal ends 605a are free from and separated from the outlet section 588, forming a gap G therebetween or between each adjacent flexible member 605. The distal ends 605b are respectively connected to or include the projections 602 that extend into the passage 592 or opening 590 and are configured to engage the spray nozzle 12. As shown in FIG. 26, the outlet section 588 of the base member 512 includes a groove or a travel path 614 on the outer surface thereof. The groove 614 extends at least partially circumferentially around the outer surface of the outlet section 288 (e.g., about 90 degrees or a quarter turn) and has an S-shape or configuration.

The rotational member 514 and/or with the flexible members 605 and/or the protrusions 602 can be the nozzle connector 600 and can comprise a ring 518 capable of being rotated relative to the base member 512 to contact the flexible members 605. In one embodiment, the nozzle connector 600 is a quarter turn quick connect connecting device.

Figure 29:
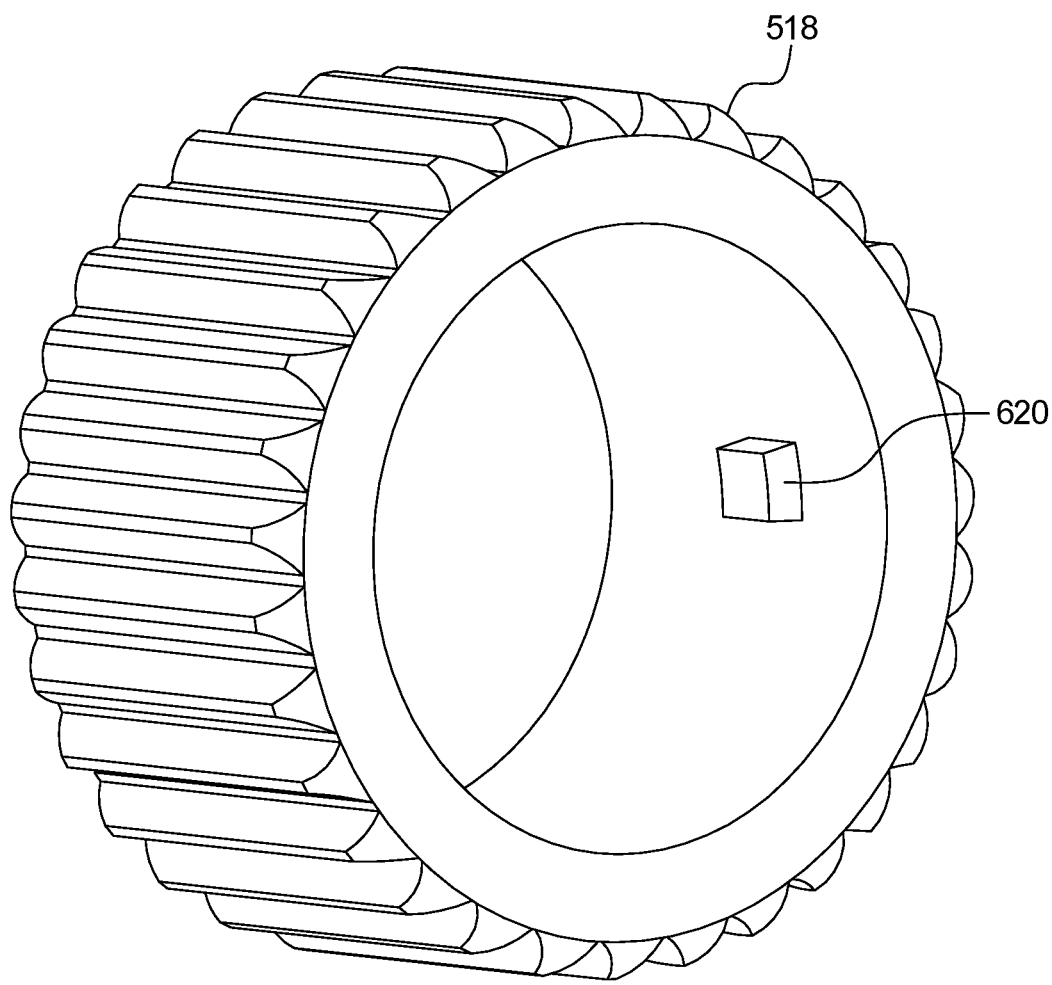
FIG. 29 is a perspective view of the outer ring of the connecting device of FIG. 24.

As shown in FIG. 29, an interior surface of the ring 518 can include a protrusion 620. The protrusion 620 is capable of being inserted into the groove 614 on the outlet section 588. The protrusion 620 is configured to guide the ring 518 along the groove 614. Thus, as can be understood, the nozzle connector 600 includes a protrusion 620 that enables the connecting device 210 to sealingly engage the spray nozzle 12 and fixedly latch the connecting device 510 to the spray nozzle 12.

The inlet section 584 preferably is sized and configured to fit within the hose 16 with an interference fit. Thus, the inlet section 584 can have an external diameter that is the same as or substantially similar to the internal diameter of the hose 16. In one embodiment, the inlet section 584 includes the hose connector 596. The hose connector 596 can be a barb 598 or other structure on the outer circumference 599 thereof to increase the friction fit between the hose 16 and the connecting device 510. In this embodiment, the barb 598 includes three radial protrusions or projections 598a-598c that project radially outwardly and in the direction of the passage 592. These projections 598a-598c can increase the friction between the connecting device 510 and the hose 16. It is noted that the hose connector 596 can be any suitable structure that would enable the hose 16 to connect to the connecting device 510 in any suitable manner.

The connecting device 510 can be 3D printed using the 3D printer P. 3D printing refers to a process in which material is joined or solidified under computer control to create a three-dimensional object, with material being complied to form the desired object. In some embodiments, a computer can refer to a smart phone, a tablet, a printer motherboard, a processor/computer in the printer, or any other device with a processor or an electronic controller. The material for the connecting device 510 can be any material, such as liquid molecules or powder grains being fused together. In some embodiments, the connecting device 510 can be printed from one or more materials such as PA12, polypropylene, and/or glass filled polyamide. However, the material can be any suitable material or materials.

It is noted that the connecting device 510 can be a 2K injection molded part, be 3D printed and/or can have a plastic material having a shore D hardness selected in the range of 50 to 80.

Figure 30:
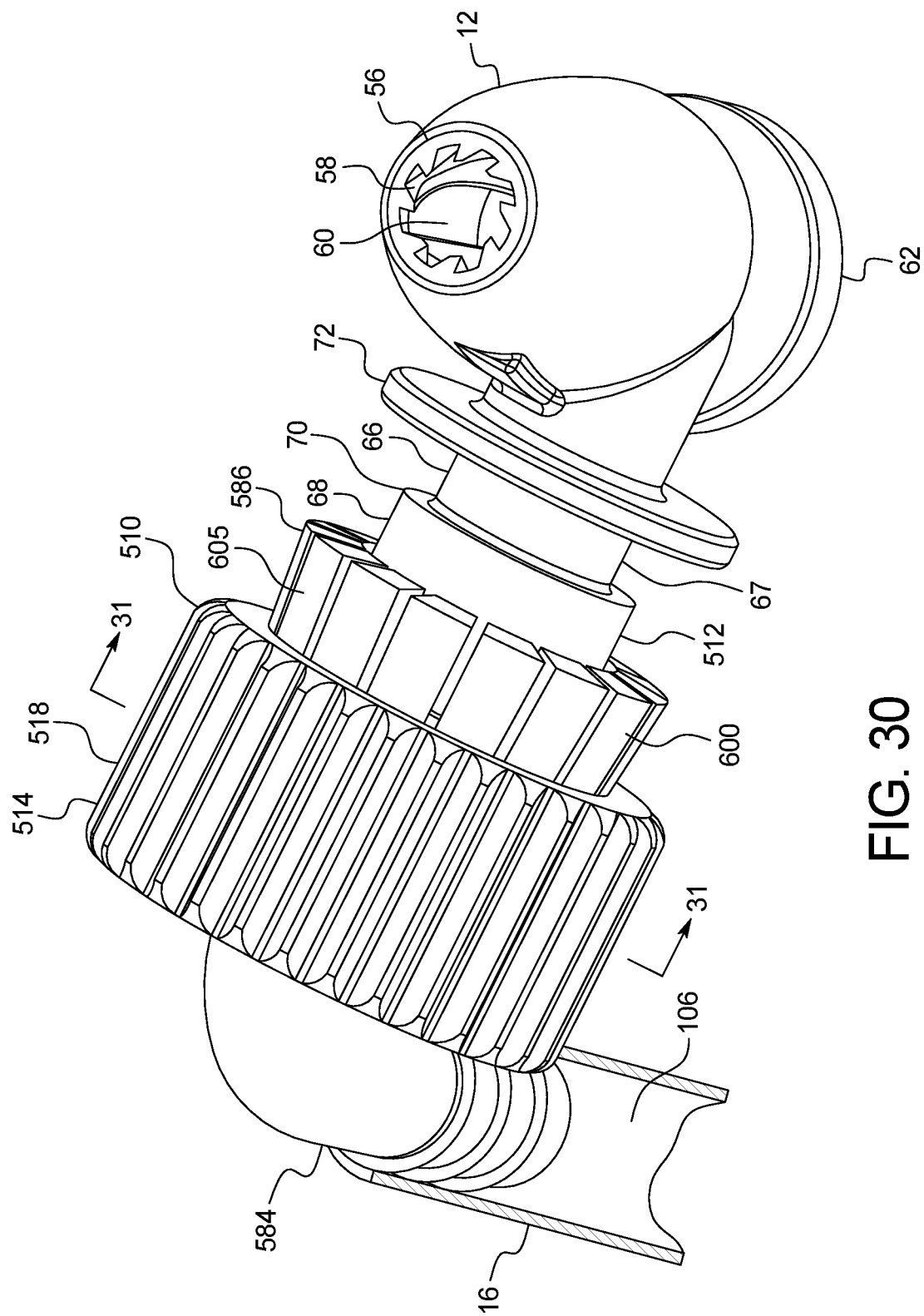
FIG. 30 is a top perspective view of the connecting device of FIG. 24 being coupled to the spray nozzle.
Figure 31:
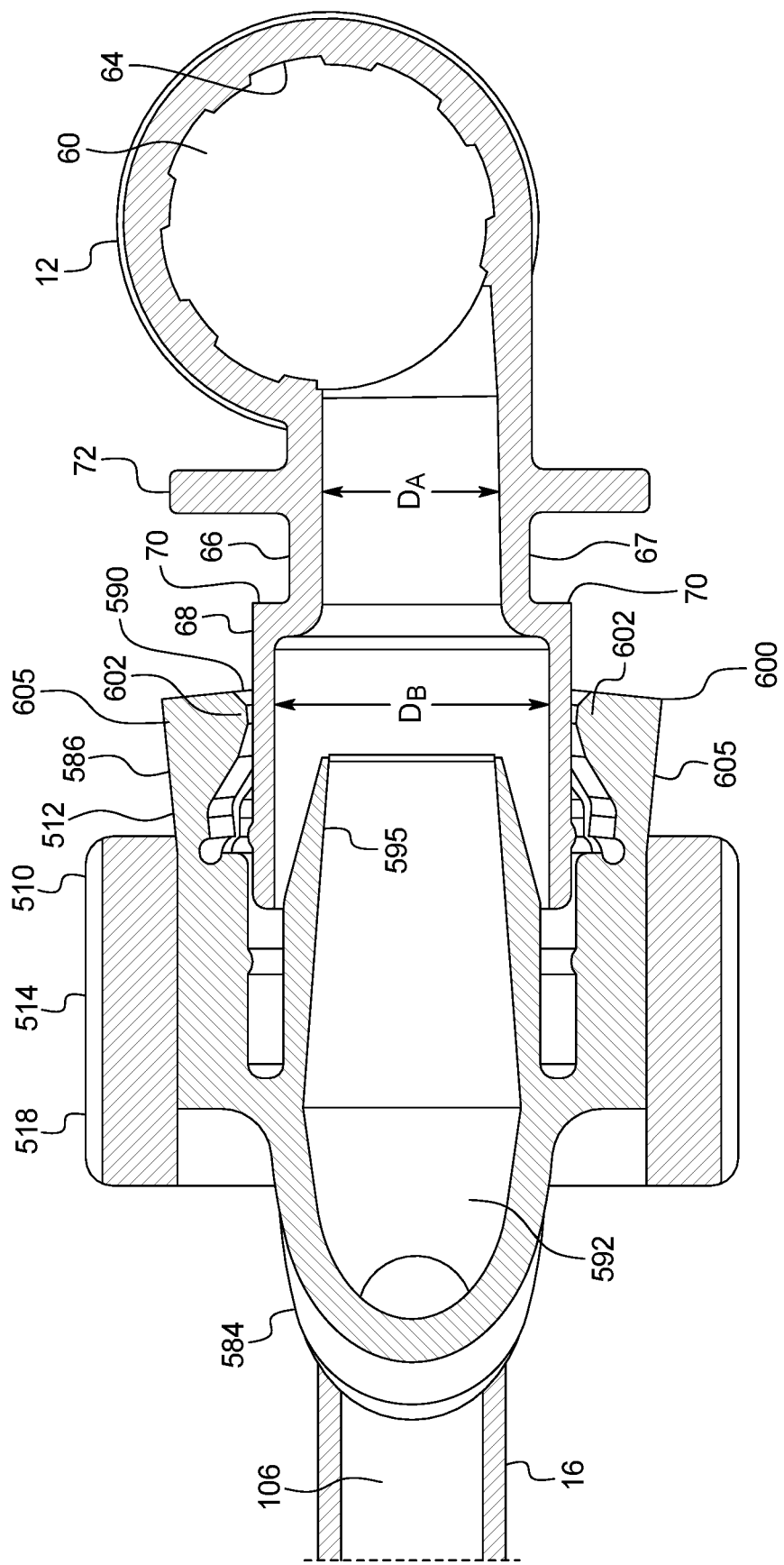
FIG. 31 is a top view in section of the connecting device of FIG. 35 taken along lines 31-31.
Figure 32:
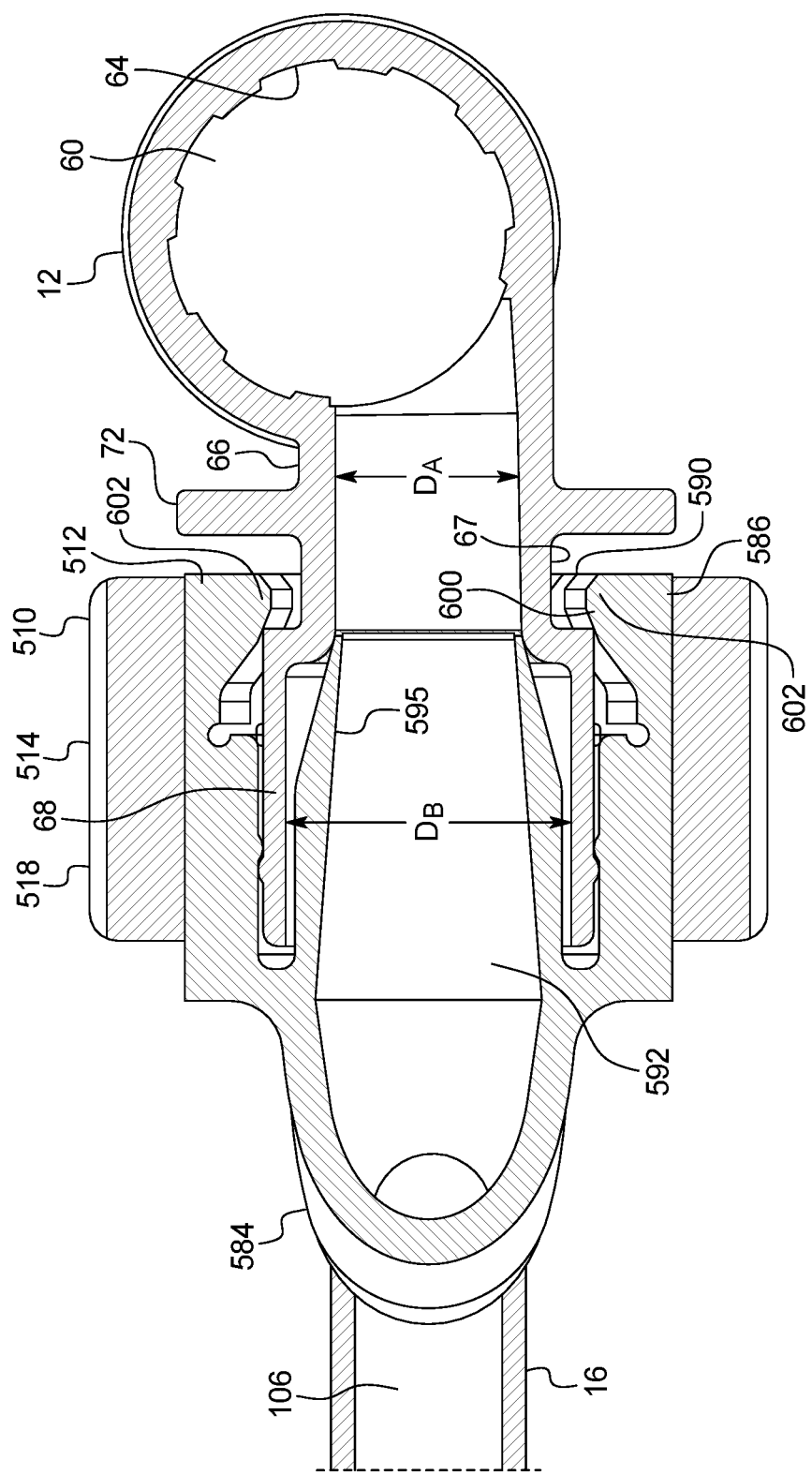
FIG. 32 is a top view in section of the connecting device of FIG. 31 coupled to the spray nozzle.

Once the connecting device 510 is 3D printed or formed in any other suitable manner, the connecting device 510 can be coupled to or connected to the hose 16 and/or the spray nozzle 12. As shown in FIGS. 30-32, the inlet section 584 can be connected to the hose 16. In one embodiment, the inlet section 584 is inserted into an interior passage 106 of the hose 16. The hose 16 can be formed from a pliable material (such as rubber) that enables some stretching or expansion of the internal diameter of the interior passage 106 of the hose 16. This stretching of the hose 16, along with the hose connector 596 (e.g., the barb 598) on the inlet section 584 causes the connecting device 510 to be securely attached to the hose 16.

The outlet section 586 of the connecting device 510 can be coupled to the spray nozzle 12. As shown in FIGS. 30-32, the outlet opening 590 in the connecting device 510 is sized and configured to except the connecting element 54. The interior nozzle portion 595 can be sized and configured to fit within the interior of the second portion 68 of the connecting portion 54. Thus the exterior diameter of the interior nozzle portion 595 can have a diameter that is less than the second diameter $D_B$ of the second portion.

The rotational member 514 is then rotated a quarter turn with the protrusion 620 guiding the ring 518 along the outlet section 588 and in the longitudinal direction of the connecting device 510 in the direction of the outlet opening 590. The interior surface of the ring 518 contacts the flexible member 605 as the ring 518 slides longitudinal in the direction of the outlet opening 590, causing the protrusions 602 of the flexible member 605 to engage shoulder 70 of the connecting element 54, and sealing connect to the connecting device 510 to the spray nozzle 12. The connecting device 510 can be removed by performing this operation in reverse, if desired.

Thus, in operation, the dispenser D can be loaded with the desired cartridge or cartridges 32, and connected to a pressurized gas supply or tank T. Upon activation of the trigger, the pressurized gas applies pressure to the piston 42, which in turn moved the shuttles 44a and 44b. The shuttles 44a and 44b compress the ends of the cartridges 32, which push the compounds out of the outlets into the mixer 14. The mixing elements 108 in the mixer 14 mix the compounds. The mixed compound exits the mixer 14 and enters the spray nozzle 12. Simultaneously or substantially simultaneously, the pressurized gas passes through the gas line 38, the hose 16 and the connecting device 510 and enters the spray nozzle 12. The spray nozzle 12 imparts a swirling or rotating motion to the pressurized gas which mixes with the mixed compound to form an atomized spray which can be applied as desired.

The embodiments disclosed herein provide an improved device to connect the hose and the spray nozzle (or any suitable components) in a dispenser or other device. The connecting device 510 is relatively simple and cost efficient to produce.

Fourth Embodiment

Figure 33:
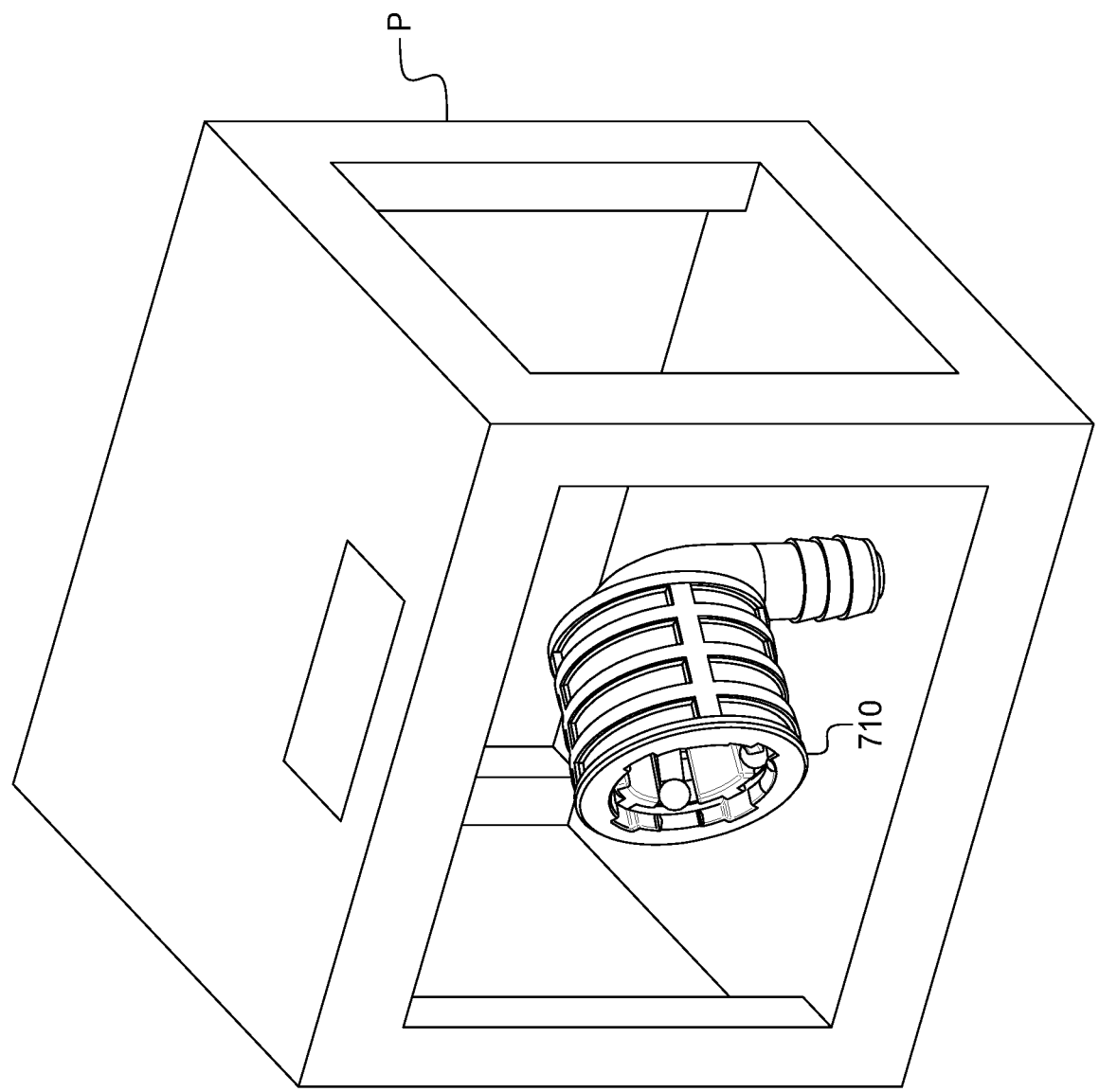
FIG. 33 is a top perspective view of a fourth embodiment of the present invention being 3D printed by a 3D printer.
Figure 34:
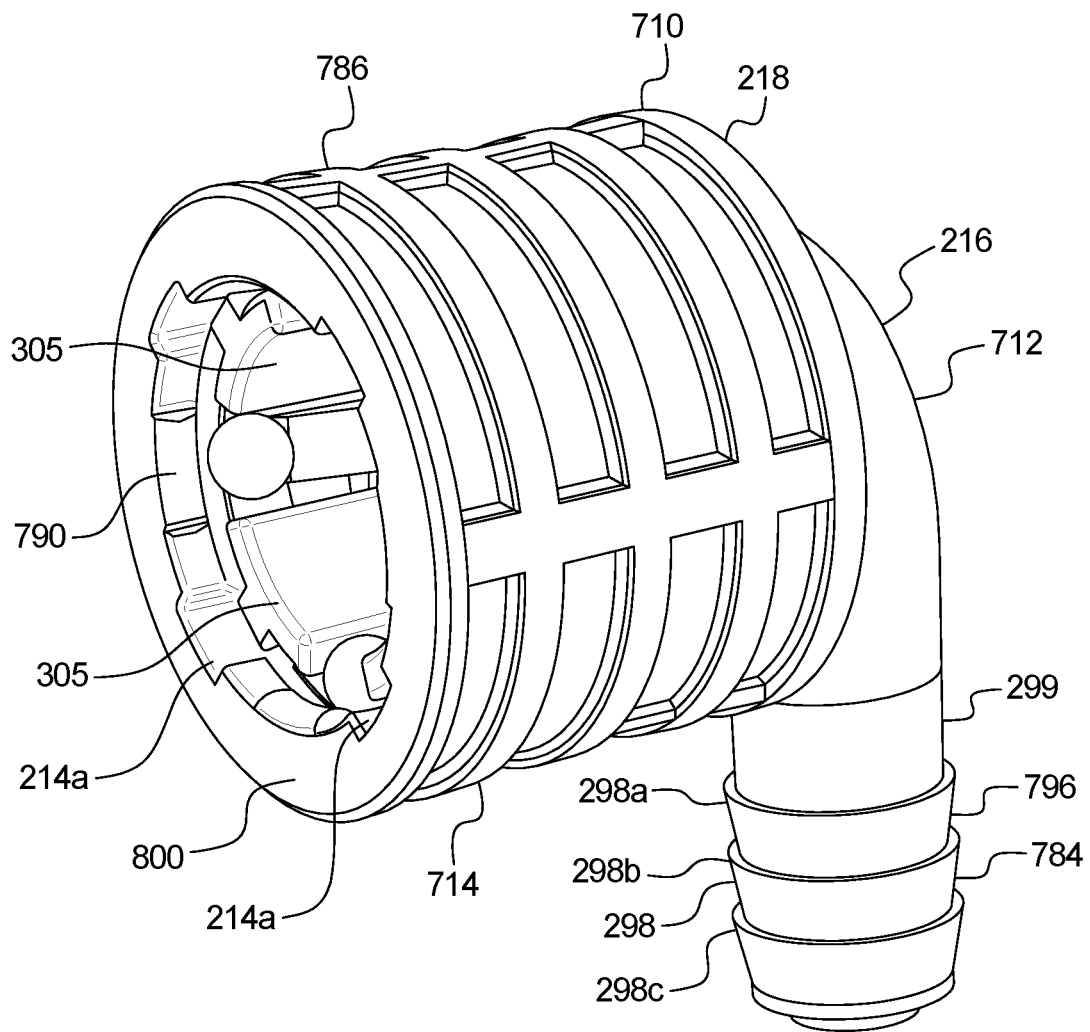
FIG. 34 is a top perspective view of the connecting device of FIG. 33.
Figure 35:
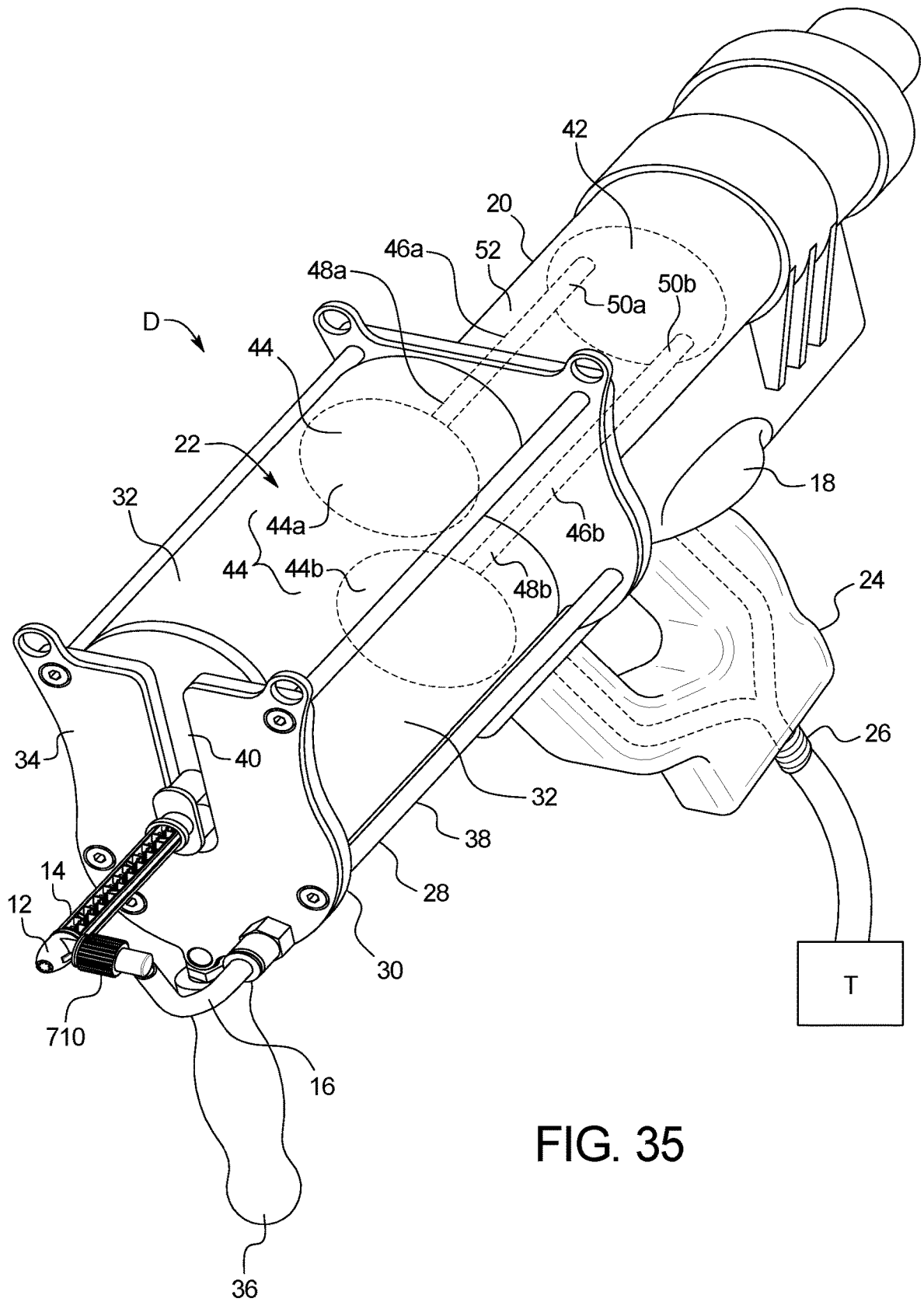
FIG. 35 is a top perspective view of a spray device that includes the connecting device of FIG. 34.
Figure 37:
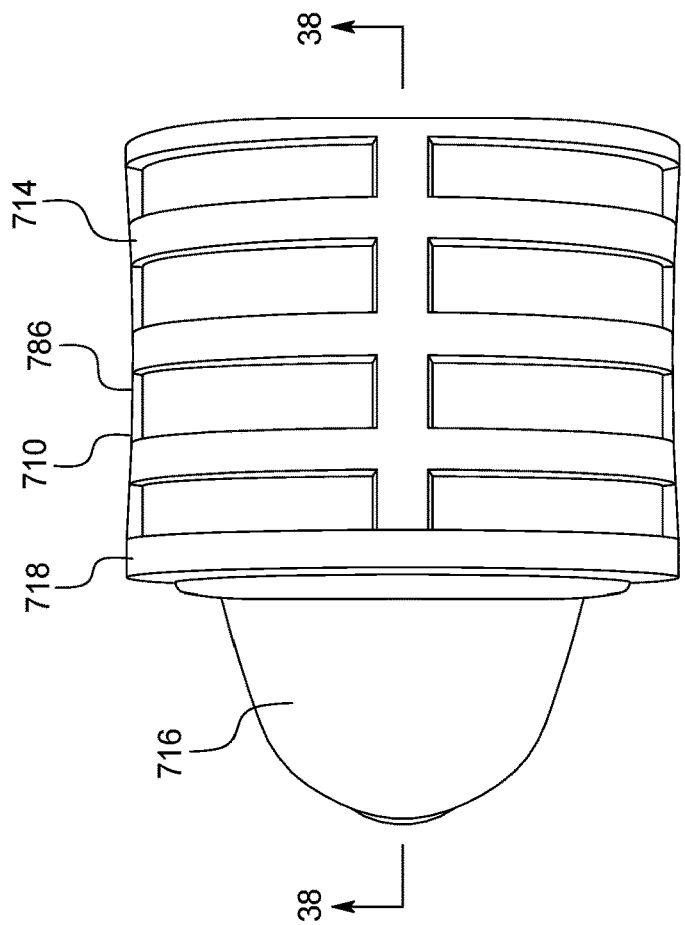
FIG. 37 is a top view of the connecting device of FIG. 34.
Figure 36:
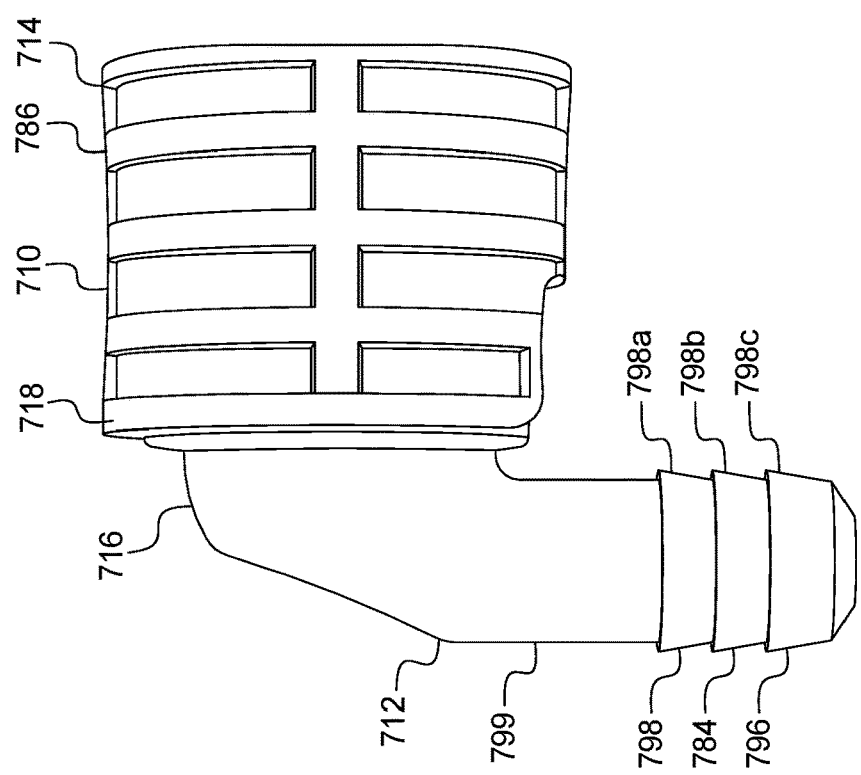
FIG. 36 is an elevational side view of the connecting device of FIG. 34.

A connecting device 710 according to a third embodiment is illustrated in FIGS. 33-42. Similarly to FIG. 1, FIG. 33 illustrates the connecting device 710 being printed by a 3D printer P. Although the connecting device 710 is shown being printed by a 3D printer, it is noted that the connecting device 710 can be formed in any suitable manner. FIG. 34 illustrates the connecting device 710 after completion of 3D printing or other suitable manner. As shown in FIG. 35, the connecting device 710 is configured to connect the first component (e.g., the spray nozzle 12) with the second component (e.g., the hose 16) in the dispenser D. The connecting device 710 can be plastic or any suitable material.

As shown in FIGS. 34 and 36-38, the connecting device 710 can be elbow shaped and of two-piece design with a hose connector 796 and a nozzle connector 800. However, it is noted that the connecting device 710 can be formed from any number of pieces desired and from any suitable material. The connecting device 710 preferably includes a base member 712 and a movable member 714. The base member 712 includes the inlet section 784 with an inlet opening 786 and the movable member 714 is disposed at or defines the outlet opening 790 of the outlet section 788. Similarly to the first embodiment, a passage 792 extends from the inlet opening 786 to the outlet opening 790. It is noted that that the connecting device 710 can include a plurality of inlet openings and outlet openings and a plurality of passages, if desired. The base member 712 has an elbow bend 716. The elbow bend 716 preferably enables the hose connector 796 to be arranged at an angle of about 90° with respect to the nozzle connector 800. However, it is noted that the angle can be any suitable or desired angle.

Figure 38:
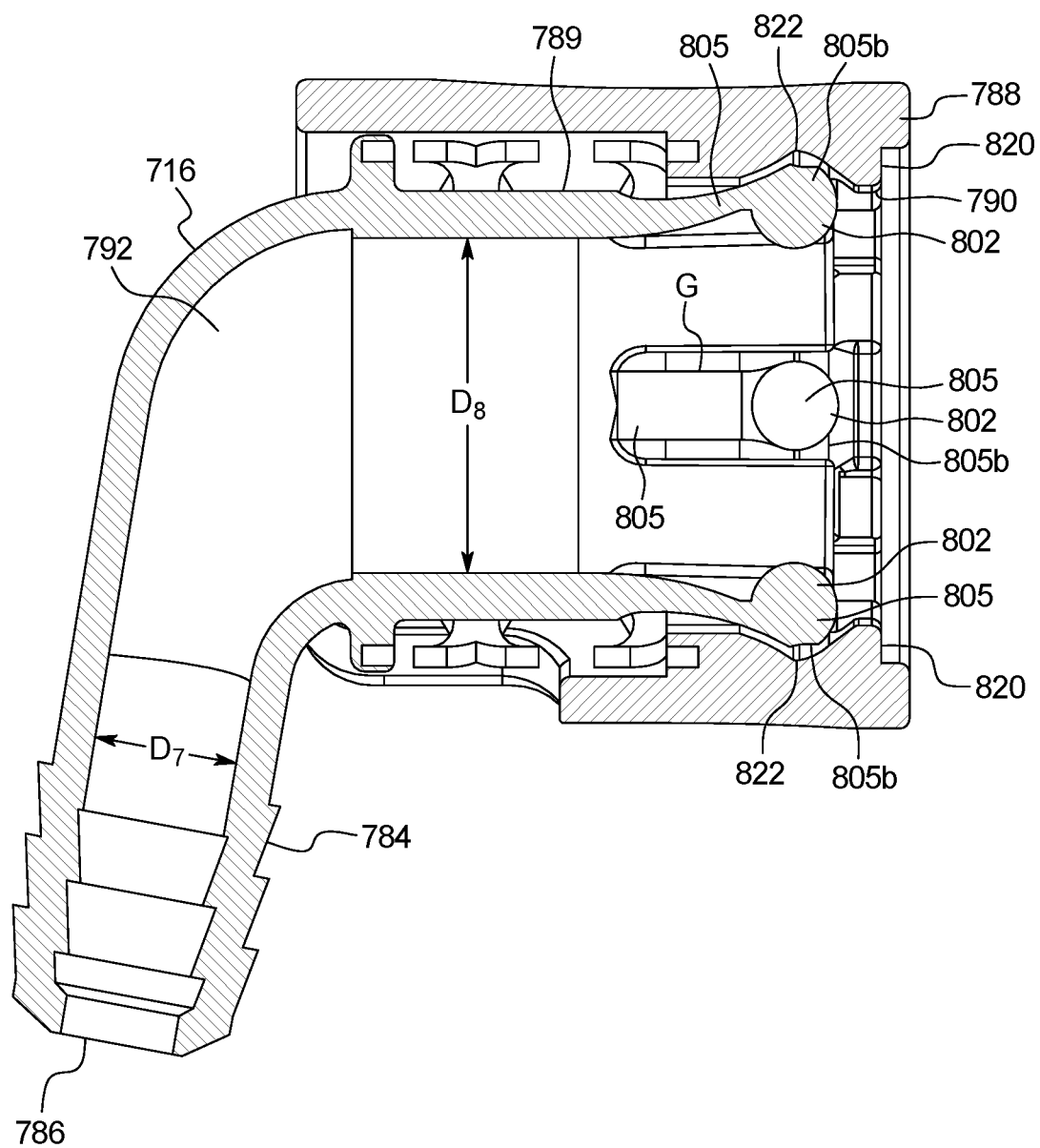
FIG. 38 is a cross-sectional view taken along line 38-38 if FIG. 37.

As shown in FIG. 38, the passage 792 has a first diameter $D_7$ at the inlet section 784 and a second diameter $D_8$ at the outlet section 788. The diameter $D_6$ can be larger than the diameter $D_5$.

The nozzle connector 800 can be a quick release mechanism for the connecting device 710, that for example, comprises a plurality of flexible members 805 (it is noted that if desired the connecting device can include one, two, three, four or more flexible members) configured to perform a retaining or releasing function of the nozzle connector 800. As understood from FIGS. 34 and 38, this embodiment includes four flexible members 805 evenly spaced about the outlet opening 790 (i.e., at about 90 degree intervals. The flexible members 805 are each coupled to a projection 802 and movement of a flexible members 805 induces a radial movement of the projection 802 coupled thereto to actuate a retaining or releasing function of the nozzle connector 800. The flexible members 805 can be flared outwardly such that engagement thereof biases the projections 802 inwardly.

As shown in FIG. 38, the flexible members 805 can be formed in the surface of the outer section 788. Thus, for example, projections 802 are disposed on a flexible members 805 that have a proximal end 805a connected to the outlet section 788 and a distal end 805b free of the outlet section 788. The sides of the flexible members 805 between the distal ends 805b and the proximal ends 805a are free from and separated from the outlet section 888, forming a gap G therebetween or between each adjacent flexible member 805. The distal ends 805b are respectively connected to or include the projections 802 that extend into the passage 792 or opening 790 and are configured to engage the spray nozzle 12.

The movable member 714 and/or with the flexible members 805 and/or the protrusions 802 can be the nozzle connector 800 and can comprise a ring 818 capable of being moved relative to the base member 712 to contact the flexible members 705. That is, the ring is capable of being slid in the longitudinal direction of the connecting device toward the outlet opening 790 of the outlet section 788.

Figure 40:
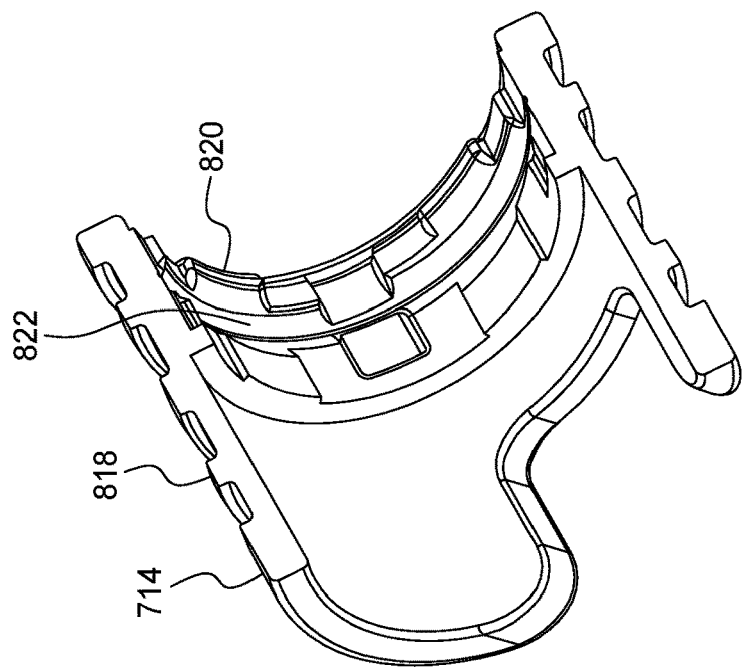
FIG. 40 is a top perspective view of the outer ring of the connecting device of FIG. 34.
Figure 39:
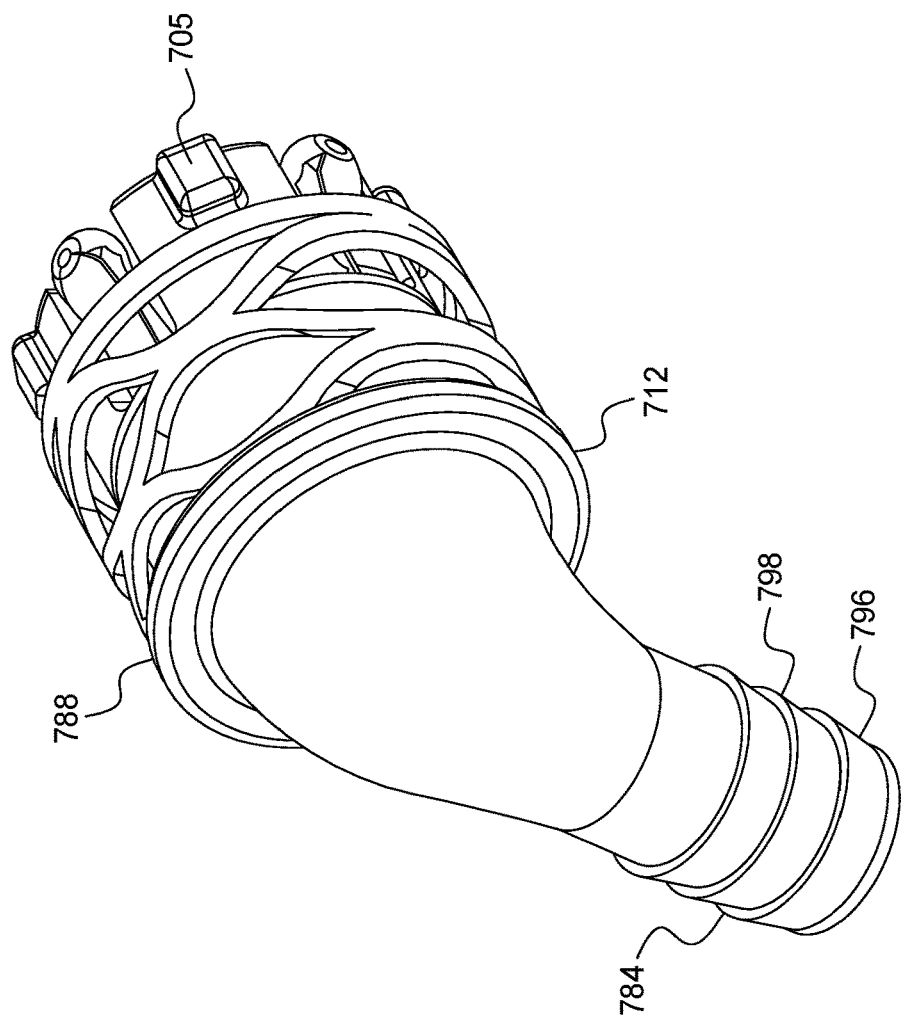
FIG. 39 is a top perspective view of the connecting device of FIG. 34 with the outer ring removed.

As shown in FIGS. 38 and 40, an interior surface of the ring 718 can include a plurality of protrusions 820 and a plurality of grooves 822. The protrusions 820 and grooves 822 are configured to lock the protrusions 802 is a locking state. Thus, as can be understood, when the ring 718 is moved in the longitudinal direction, the nozzle connector 800, including the protrusions 820 and grooves 822 and the flexible member 705, enables the connecting device 710 to sealingly engage the spray nozzle 12 and fixedly latch the connecting device 710 to the spray nozzle 12.

The inlet section 784 preferably is sized and configured to fit within the hose 16 with an interference fit. Thus, the inlet section 784 can have an external diameter that is the same as or substantially similar to the internal diameter of the hose 16. In one embodiment, the inlet section 784 includes the hose connector 796. The hose connector 796 can be a barb 798 or other structure on the outer circumference 799 thereof to increase the friction fit between the hose 16 and the connecting device 710. In this embodiment, the barb 798 includes three radial protrusions or projections 798a-798c that project radially outwardly and in the direction of the passage 792. These projections 798a-798c can increase the friction between the connecting device 710 and the hose 16. It is noted that the hose connector 796 can be any suitable structure that would enable the hose 16 to connect to the connecting device 710 in any suitable manner.

The connecting device 710 can be 3D printed using the 3D printer P. 3D printing refers to a process in which material is joined or solidified under computer control to create a three-dimensional object, with material being complied to form the desired object. In some embodiments, a computer can refer to a smart phone, a tablet, a printer motherboard, a processor/computer in the printer, or any other device with a processor or an electronic controller. The material for the connecting device 710 can be any material, such as liquid molecules or powder grains being fused together. In some embodiments, the connecting device 710 can be printed from one or more materials such as PA12, polypropylene, and/or glass filled polyamide. However, the material can be any suitable material or materials.

It is noted that the connecting device 710 can be a 2K injection molded part, be 3D printed and/or can have a plastic material having a shore D hardness selected in the range of 50 to 80.

Figure 42:
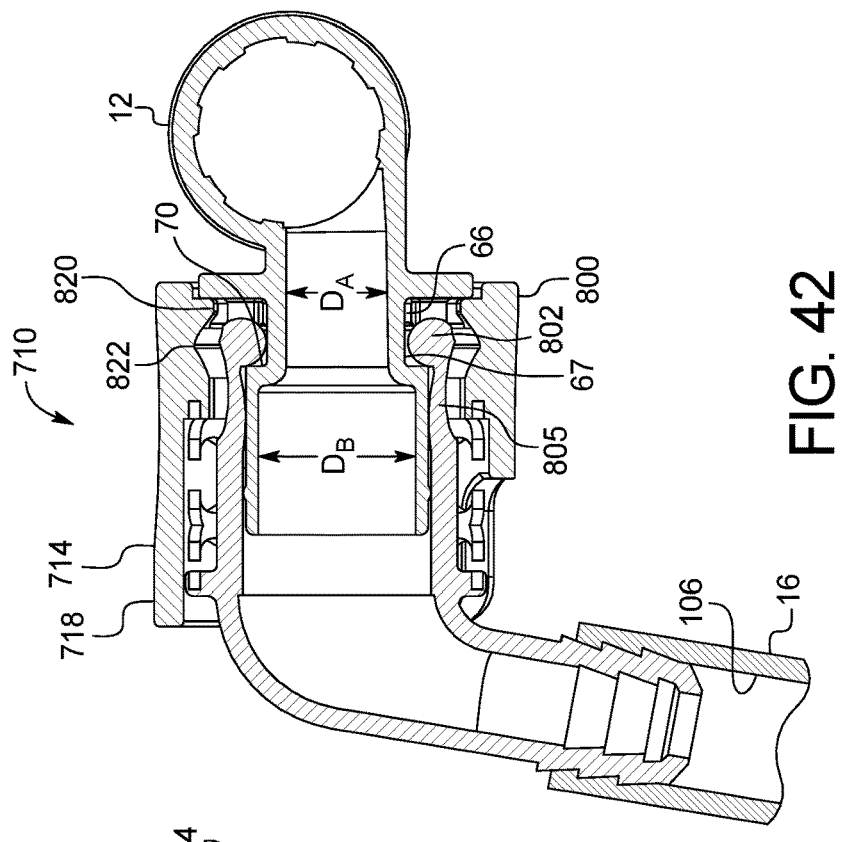
FIG. 42 is a top view in section of the connecting device of FIG. 34 coupled to the spray nozzle.
Figure 41:
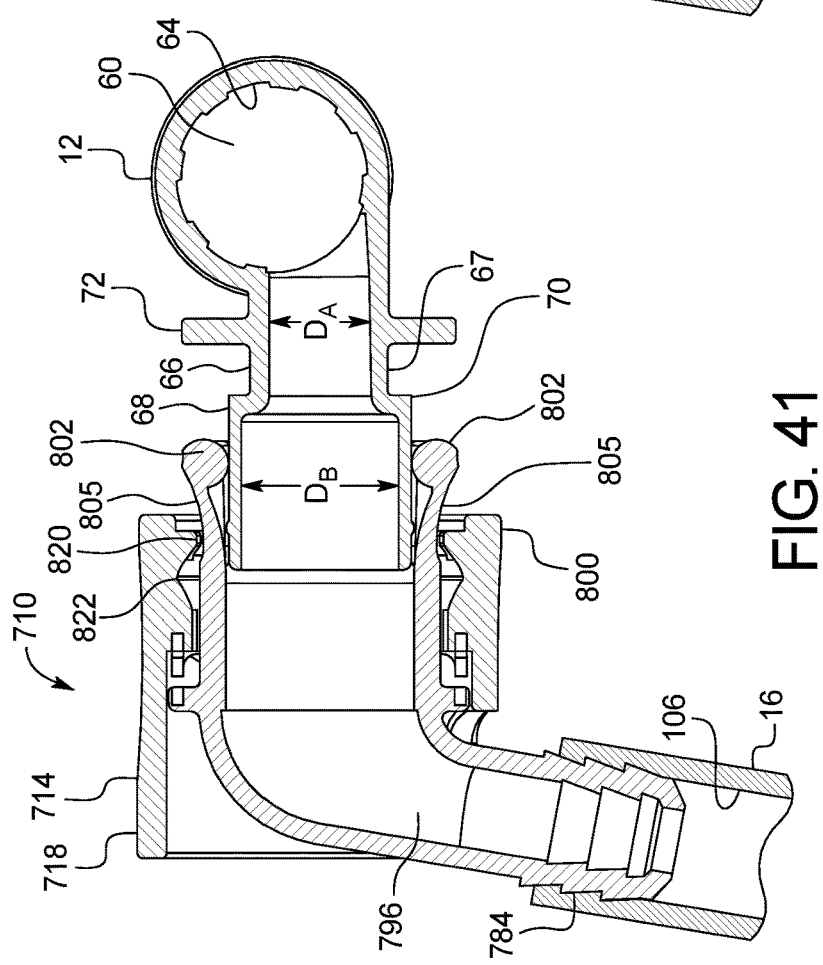
FIG. 41 is a top view in section of the connecting device of FIG. 34 being coupled to the spray nozzle.

Once the connecting device 710 is 3D printed or formed in any other suitable manner, the connecting device 710 can be coupled to or connected to the hose 16 and/or the spray nozzle 12. As shown in FIGS. 41 and 42, the inlet section 784 can be connected to the hose 16. In one embodiment, the inlet section 784 is inserted into an interior passage 106 of the hose 16. The hose 16 can be formed from a pliable material (such as rubber) that enables some stretching or expansion of the internal diameter of the interior passage 106 of the hose 16. This stretching of the hose 16, along with the hose connector 796 (e.g., the barb 798) on the inlet section 784 causes the connecting device 710 to be securely attached to the hose 16.

The outlet section 786 of the connecting device 710 can be coupled to the spray nozzle 12. As shown in FIGS. 41 and 42, the outlet opening 790 in the connecting device 710 is sized and configured to except the connecting element 54. 77.

The movable member 714 is then moved the longitudinal direction of the connecting device 710 in the direction of the outlet opening 790. The interior surface of the ring 718 contacts the flexible member 805 as the ring 718 slides longitudinal in the direction of the outlet opening 790, causing the protrusions 702 of the flexible member 705 to engage shoulder 70 of the connecting element 54, and sealing connect to the connecting device 510 to the spray nozzle 12. The flexible members 805 are then locked into the grooves 822. The connecting device 710 can be removed by performing this operation in reverse, if desired.

Thus, in operation, the dispenser D can be loaded with the desired cartridge or cartridges 32, and connected to a pressurized gas supply or tank T. Upon activation of the trigger, the pressurized gas applies pressure to the piston 42, which in turn moved the shuttles 44a and 44b. The shuttles 44a and 44b compress the ends of the cartridges 32, which push the compounds out of the outlets into the mixer 14. The mixing elements 108 in the mixer 14 mix the compounds. The mixed compound exits the mixer 14 and enters the spray nozzle 12. Simultaneously or substantially simultaneously, the pressurized gas passes through the gas line 38, the hose 16 and the connecting device 510 and enters the spray nozzle 12. The spray nozzle 12 imparts a swirling or rotating motion to the pressurized gas which mixes with the mixed compound to form an atomized spray which can be applied as desired.

The embodiments disclosed herein provide an improved device to connect the hose and the spray nozzle (or any suitable components) in a dispenser or other device. The connecting device 510 is relatively simple and cost efficient to produce.

Fifth Embodiment

Figure 43:
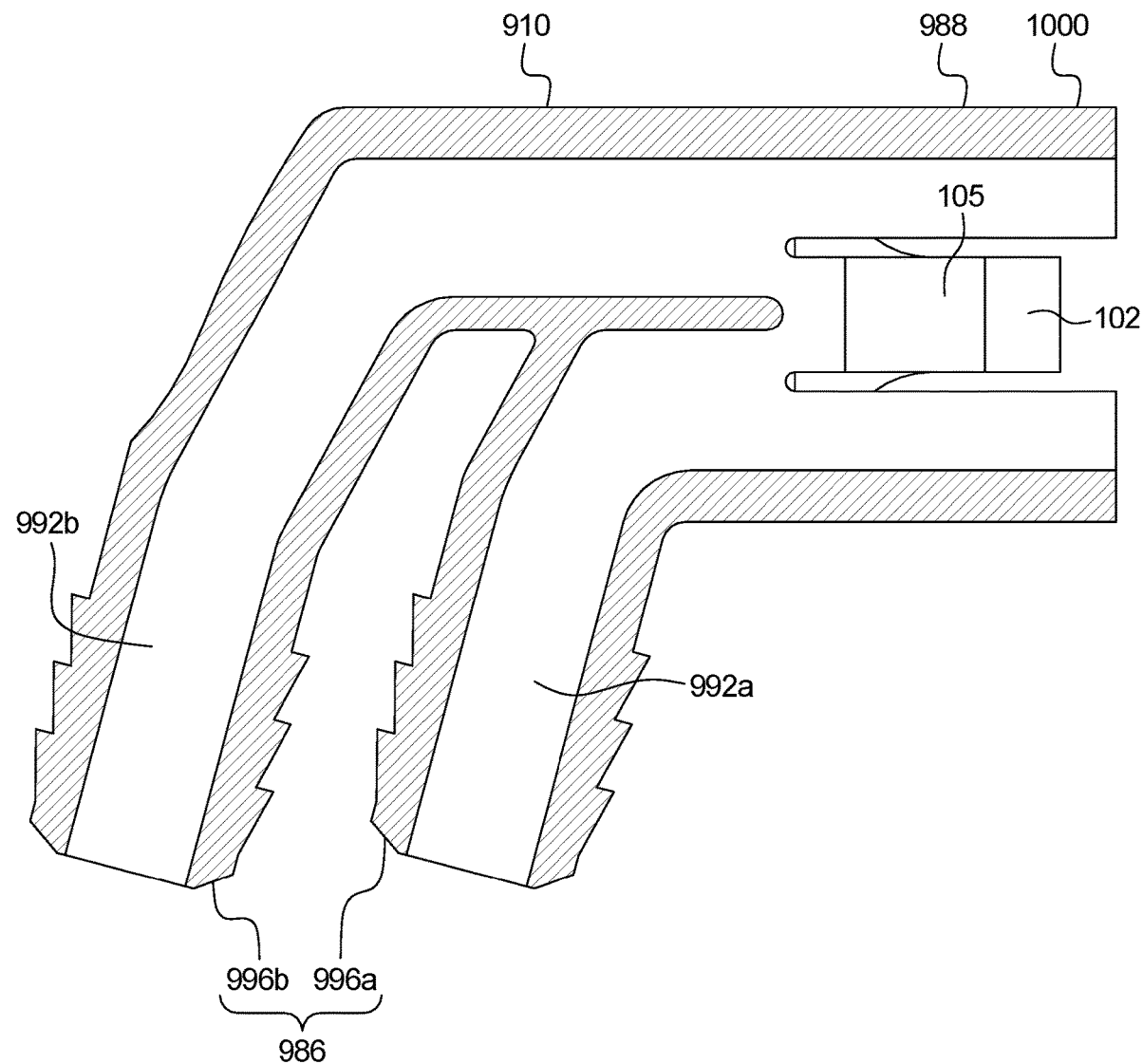
FIG. 43 is a fifth embodiment having two inlet sections.

In a Fifth embodiment illustrated in FIG. 43, the connecting device 910 can include an outlet section 988 and an inlet section 986 with a plurality of (e.g., two) inlet (hose) connectors 996a and 996b. Accordingly, in this embodiment, the inlet section 986 comprises two (or more) inlet connectors 996a and 996b, and the outlet section 988 comprises one outlet connector 1000 with two or more passages 992a and 992b extending between the inlet section 986 and the outlet section 988.

GENERAL INTERPRETATION OF TERMS

In understanding the scope of the present invention, the term "comprising" and its derivatives, as used herein, are intended to be open ended terms that specify the presence of the stated features, elements, components, groups, and/or steps, but do not exclude the presence of other unstated features, elements, components, groups, integers and/or steps. The foregoing also applies to words having similar meanings such as the terms, "including", "having" and their derivatives. Also, the terms "part," "section," or "element" when used in the singular can have the dual meaning of a single part or a plurality of parts. Accordingly, these terms, as utilized to describe the present invention should be interpreted relative to a connecting device.

The term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A spray mixer comprising:
   a cartridge filled with a one-component or multi-component material having one or more outlets;
   a mixer attached to the outlets of the cartridge;
   a spray nozzle connected either directly to the outlet of the cartridge or to the outlet of the mixer; and
   a connecting device for connecting the spray nozzle and a component to one another, the connecting device connected to the spray nozzle for the supply of a gas, the connecting device comprising an inlet section with a first connector for the component, an outlet section with a second connector for the spray nozzle, with one or more passages extending between the inlet section and the outlet section, with the connecting device being of single piece design and being plastic, and the second connector being a movable quick release mechanism integrally formed at the outlet section, the movable quick release mechanism including a flexible arm having a proximal end connected to the outlet section and a distal end free of the outlet section, and a locking protrusion disposed on the distal end of the flexible arm.

2. The spray mixer in accordance with claim 1, wherein the connecting device is an elbow and the component is a hose and the connecting device is configured to connect the hose to the spray.

3. The spray mixer in accordance with claim 1, wherein the first connector of the connecting device is a hose connector arranged at an end of the connecting device and the movable quick release mechanism is a nozzle connector at the other end of the connecting device with a passage extending from the hose connector to the nozzle connector.

4. The spray mixer according to claim 3, wherein the hose connector is a hose barb.

5. The spray mixer according to claim 3, wherein the flexible arm of the nozzle connector is one of a wing of one, two or more wings configured to actuate the locking protrusion of the nozzle connector.

6. The spray mixer according to claim 5, wherein the one, two or more wings are each coupled to the locking protrusion and movement of a respective wing induces a radial movement of the locking protrusion to actuate a retaining or releasing function of the nozzle connector.

7. The spray mixer according to claim 5, wherein the one, two or more wings are spring loaded with respect to a body of the connecting device.

8. The spray mixer according to claim 3, wherein the hose connector comprises one, two or more projections projecting radially toward the passage.

9. The spray mixer according claim 3, further comprising a seal arranged at the nozzle connector.

10. The spray mixer according to claim 3, wherein the hose connector is arranged at an angle selected in the range of 30° to 60° with respect to the nozzle connector.

11. The spray mixer according to claim 1, wherein the connecting device is a 3D printed elbow.

12. The spray mixer according to claim 1, wherein the connecting device is configured to conduct pressurized gas.

13. The spray mixer according to claim 1, wherein the connecting device is an elbow configured to be coupled to the spray nozzle for the supply of gas in order to spray fluid components exiting a cartridge either directly or multi-component materials mixed by way of a mixing element.

14. The spray mixer according to claim 1, wherein the movable quick release mechanism is a single outlet connector, and one passage extends between the inlet section and the outlet section.

15. The spray mixer according to claim 1, wherein movable quick release mechanism is a single outlet connector, and two or more passages extend between the inlet section and the outlet section.

16. The spray mixer according to claim 1, wherein the first connector is one of two or more inlet connectors, the movable quick release mechanism is a single outlet connector, and two or more passages extends between the inlet section and the outlet section.

* * * * *